United States Patent
Jung et al.

(10) Patent No.: US 11,051,337 B2
(45) Date of Patent: Jun. 29, 2021

(54) COMMUNICATION METHOD AND APPARATUS USING MULTIPLE CHANNELS IN UNLICENSED BAND

(71) Applicants: Samsung Electronics Co., Ltd., Suwon-si (KR); Seoul National University R&DB Foundation, Seoul (KR)

(72) Inventors: Byounghoon Jung, Suwon-si (KR); Jihoon Kim, Seongnam-si (KR); Sunghyun Choi, Seoul (KR); Kangjin Yoon, Seoul (KR); Jaehong Yi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 4 days.

(21) Appl. No.: 16/565,305

(22) Filed: Sep. 9, 2019

(65) Prior Publication Data

US 2020/0084802 A1    Mar. 12, 2020

(30) Foreign Application Priority Data

Sep. 7, 2018    (KR) ................ 10-2018-0107372

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01); *H04W 74/0833* (2013.01)

(58) Field of Classification Search
CPC ......... H04W 74/0808; H04W 74/0833; H04W 16/14
See application file for complete search history.

(56) References Cited

U.S. PATENT DOCUMENTS

| | | | |
|---|---|---|---|
| 10,716,144 B2* | 7/2020 | Suzuki | H04J 11/00 |
| 2016/0323915 A1 | 11/2016 | Liu et al. | |
| 2018/0176961 A1* | 6/2018 | Babaei | H04W 74/0833 |
| 2019/0098661 A1* | 3/2019 | Ye | H04W 74/02 |
| 2019/0132871 A1* | 5/2019 | Suzuki | H04W 74/0808 |
| 2019/0132882 A1* | 5/2019 | Li | H04W 74/0833 |
| 2020/0008240 A1* | 1/2020 | Golitschek Edler von Elbwart et al. | H04W 72/042 |

* cited by examiner

*Primary Examiner* — Rasheed Gidado

(57) ABSTRACT

A communication method using a plurality of channels in a wireless communication system supporting an unlicensed band. The communication method includes: performing listen-before-talk (LBT) for transmitting a random access preamble on each of a plurality of control channels supported by a user equipment (UE), from among a plurality of control channels supported by a base station; transmitting a random access preamble through a control channel where the LBT succeeded from among the plurality of control channels where the LBT for transmitting the random access preamble is performed; and receiving a random access response (RAR) through a control channel determined according to a result of the LBT performed by the base station, from among the plurality of control channels supported by the UE, wherein a control channel is a channel through which a control signal and a data signal are transmitted and received.

18 Claims, 19 Drawing Sheets

| RAPID | Channel ID | Timing Advance | UL Grant | Temporary C-RNTI | etc. |

FORMAT OF RAR

FIG. 14
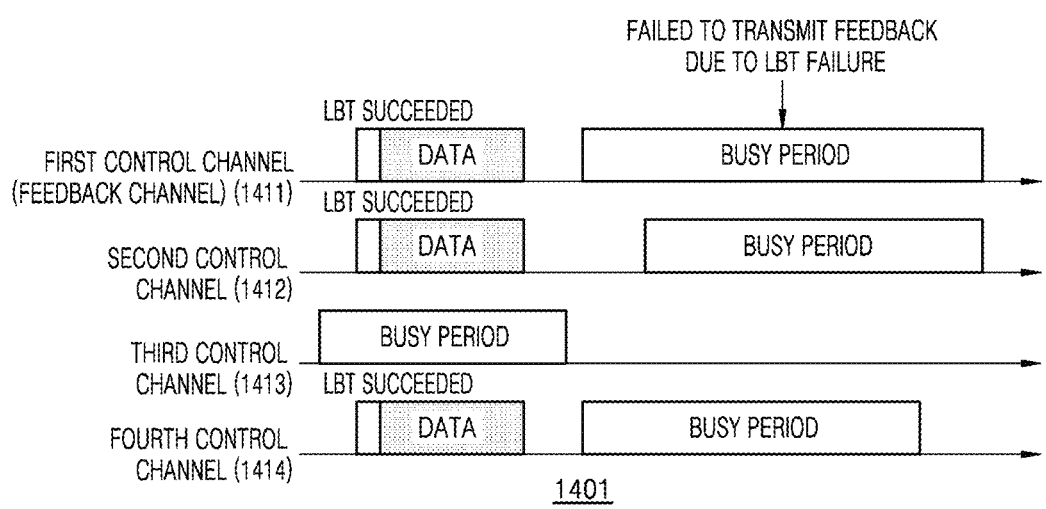
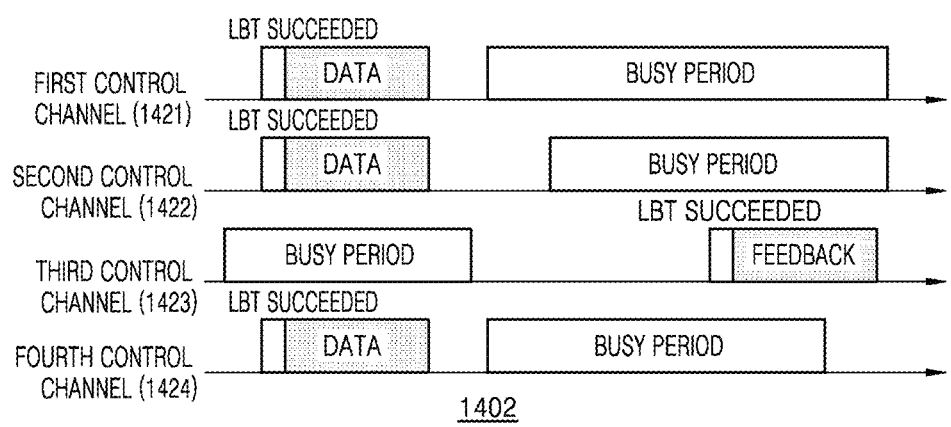

COMMUNICATION METHOD AND APPARATUS USING MULTIPLE CHANNELS IN UNLICENSED BAND

CROSS-REFERENCE TO RELATED APPLICATION

This application is based on and claims priority under 35 U.S.C. C. § 119 to Korean Patent Application No. 10-2018-0107372 filed on Sep. 7, 2018 in the Korean Intellectual Property Office, the disclosure of which is incorporated by reference herein in its entirety.

BACKGROUND

1. Field

The disclosure relates to a communication method in a wireless communication system supporting an unlicensed band, and more particularly, to a communication method using multiple channels in an unlicensed band.

2. Description of Related Art

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies, for example: beamforming, massive multiple-input multiple-output (MIMO), Full Dimensional MIMO (FD-MIMO), array antennas, analog beam-forming, and large-scale antennas, are being studied and have been discussed. In order to improve system networks for 5G communication systems, various technologies have been developed, e.g.: evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and are combined with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

With the rapid increase in wireless communication traffic, securing of a wider frequency band is increasingly becoming an urgent issue. Accordingly, in various communication systems, methods of performing wireless communication by using frequencies of not only a licensed band (L-band) but also an unlicensed band (U-band), such as a 5.8 GHz WiFi band, are considered for use in each communication system.

SUMMARY

Provided is a method of performing wireless communication by using multiple channels in an unlicensed band.

Additional aspects will be set forth in part in the description which follows and, in part, will be apparent from the description, or may be learned by practice of the presented embodiments of the disclosure.

According to an embodiment of the disclosure, a communication method using a plurality of channels in a wireless communication system supporting an unlicensed band includes: performing listen-before-talk (LBT) for transmitting a random access preamble on each of a plurality of control channels supported by a user equipment (UE), from among a plurality of control channels supported by a base station; transmitting a random access preamble through a control channel where the LBT succeeded from among the plurality of control channels where the LBT for transmitting the random access preamble is performed; and receiving a random access response (RAR) through a control channel determined according to a result of LBT performed by the base station, from among the plurality of control channels supported by the UE.

In some embodiments, the random access preamble may be generated based on a control channel supported by the UE from among the plurality of control channels supported by the base station, and the communication method may further include: determining whether scheduling information regarding a third message (msg3) is included in the received RAR; performing LBT for transmitting the msg3 on at least one scheduled control channel or the plurality of control channels where the LBT for transmitting the random access preamble is performed, based on a result of the determining; transmitting the msg3 through at least one control channel where the LBT for transmitting the msg3 succeeded from among at least one control channel where the LBT for transmitting the msg3 is performed; and receiving a fourth message (msg4) through a control channel determined according to a result of the LBT performed by the base station, from among the plurality of control channels supported by the UE.

In some embodiments, the transmitting of the random access preamble may include transmitting a plurality of random access preambles through a plurality of control channels where the LBT succeeded from among the plurality of control channels where the LBT for transmitting the random access preamble is performed, and the transmitting of the msg3 may include, when a plurality of RARs are received from the base station, transmitting at least one msg3 corresponding to at least one RAR from among the plurality of RARs, wherein the at least one msg3 includes the same contention resolution identifier (CRI).

In some embodiments, the RAR may include identification information of a control channel through which the UE transmitted the random access preamble, and the communication method may further include determining whether the RAR is transmitted to the UE, based on the identification information of the control channel or a random access-radio network temporary identifier (RA-RNTI) generated according to the identification information of the control channel.

In some embodiments, the transmitting of the random access preamble may include: determining priorities with respect to the plurality of control channels supported by the UE, based on a pre-set standard, wherein the priorities are considered when determining a control channel through which the random access preamble is to be transmitted; determining a control channel through which the random access preamble is to be transmitted, based on the determined priorities, when there are two or more control channels where the LBT succeeded from among the plurality of control channels where the LBT for transmitting the random access preamble is performed; and transmitting the random access preamble through the determined control channel.

In some embodiments, the communication method may further include retransmitting the random access preamble when decoding of the RAR fails, wherein the retransmitting of the random access preamble may include: downgrading the priority of the control channel through which the random access preamble is transmitted; determining a control channel through which the random access preamble is to be retransmitted, based on the downgraded priority; and retransmitting the random access preamble through the determined control channel.

In some embodiments, the communication method may further include, when decoding of the RAR fails, transmitting a retransmission preamble including information enabling the base station to downgrade the priority of the control channel through which the RAR is transmitted.

In some embodiments, the communication method may further include retransmitting the random access preamble when decoding of the RAR fails, wherein the retransmitting of the random access preamble includes, when the UE retransmits the random access preamble through the control channel through which the random access preamble is transmitted, retransmitting the random access preamble after increasing transmission power.

In some embodiments, the random access preamble may be assigned by the base station.

In some embodiments, the random access preamble may be generated based on which control channel the UE supports from among the plurality of control channels supported by the base station, and may include at least one piece of information from among information about whether the UE retransmitted the random access preamble, the control channel through which the random access preamble is transmitted before the UE retransmits the random access preamble, the plurality of control channels supported by the UE, and a bandwidth size supported by the UE, and the control channel through which the RAR is received is determined based on at least one piece of information from among the information included in the random access preamble.

In some embodiments, the communication method may further include transmitting feedback on downlink data transmission, wherein the transmitting of the feedback includes: performing LBT for transmitting the feedback on each of the plurality of control channels supported by the UE from among the plurality of control channels supported by the base station; and transmitting the feedback through a control channel where the LBT succeeded from among the plurality of control channels where the LBT for transmitting the feedback is performed.

In some embodiments, the communication method may further include transmitting uplink data, wherein the transmitting of the uplink data includes: performing LBT for transmitting the uplink data on each of the plurality of control channels supported by the UE; determining at least one channel through which the uplink data is to be transmitted and a subframe of the uplink data to be transmitted through the at least one channel, based on a result of the LBT for transmitting the uplink data and scheduling information regarding transmission of the uplink data; and transmitting the determined subframe of the uplink data through the determined at least one channel.

According to another embodiment of the disclosure, a user equipment (UE) using a plurality of channels in a wireless communication system supporting an unlicensed band, includes: a transceiver; a memory; and at least one processor configured to: perform listen-before-talk (LBT) for transmitting a random access preamble on each of a plurality of control channels supported by the UE from among a plurality of control channels supported by a base station; transmit the random access preamble through a control channel where the LBT succeeded from among the plurality of control channels where the LBT for transmitting the random access preamble is performed; and receive a random access response (RAR) through a control channel determined as a result of the LBT performed by the base station from among the plurality of control channels supported by the UE.

According to another embodiment of the disclosure, a communication method using a plurality of channels in a wireless communication system supporting an unlicensed band, includes: transmitting information of a plurality of control channels supported by a base station to a user equipment (UE); receiving a random access preamble through a control channel determined as a result of listen-before-talk (LBT) performed by the UE from among pluralities of control channels supported by the UE and the base station; performing LBT for transmitting a random access response (RAR) on each of the plurality of control channels supported by the UE from among the plurality of control channels supported by the base station; and transmitting the RAR through a control channel determined as a result of the LBT performed by the base station from among the plurality of control channels supported by the UE, wherein the control channel is a channel through which a control signal and a data signal are transmitted and received, and the random access preamble is generated based on a control channel supported by the UE from among the plurality of control channels supported by the base station.

According to another embodiment of the disclosure, a base station using a plurality of channels in a wireless communication system supporting an unlicensed band, the base station includes: a transceiver; a memory; and at least one processor configured to: transmit information of a plurality of control channels supported by the base station to a user equipment (UE); receive a random access preamble through a control channel determined as a result of listen-before-talk (LBT) performed by the UE from among pluralities of control channels supported by the UE and the base station; perform LBT for transmitting a random access response (RAR) on each of the plurality of control channels supported by the UE from among the plurality of control channels supported by the base station; and transmit the RAR through a control channel determined as a result of the LBT performed by the base station from among the plurality of control channels supported by the UE, wherein the control channel is a channel through which a control signal and a data signal are transmitted and received, and the random access preamble is generated based on a control channel supported by the UE from among the plurality of control channels supported by the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a diagram for describing a random access response (RAR) including identification information of a control channel through which a UE transmitted a random access preamble, according to some embodiments of the disclosure;

FIG. 14 illustrates a diagram for describing a method, performed by a UE, of transmitting feedback to a base station by using multiple channels, according to some embodiments of the disclosure;

DETAILED DESCRIPTION

Figure 1:
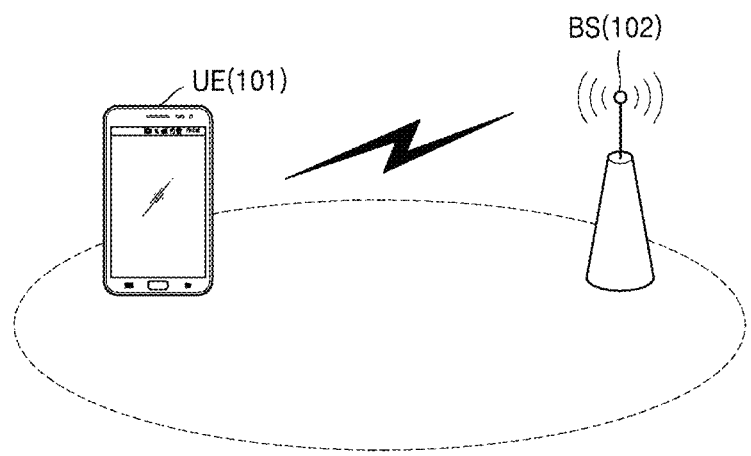
FIG. 1 illustrates a diagram for describing an example of a wireless communication system supporting an unlicensed band, according to some embodiments of the disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments of the disclosure, descriptions of technical contents that are well known in the technical field to which the disclosure belongs and are not directly related to the disclosure will be omitted. By omitting unnecessary description, the subject matter of the disclosure may be more clearly delivered without obscuring the same.

For the same reasons, components may be exaggerated, omitted, or schematically illustrated in drawings for clarity. Also, the size of each component does not completely reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, the present embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Hereinafter, for convenience of description, some terms and names defined by the 3rd Generation Partnership Project Long Term Evolution (3GPP LTE) standard or the 3GPP New Radio (NR) standard may be used. However, the disclosure is not limited by such terms and names, and may be equally applied to systems conforming to other standards.

Hereinafter, a BS is an entity that allocates resources of a terminal, and may be at least one of a gNB, an eNB, an NB, a BS, a wireless access unit, a BS controller, or a node on a network. Examples of a terminal may include user equipment (UE), a mobile station (MS), a cellular phone, a smartphone, a computer, and a multimedia system capable of performing a communication function. The examples are not limited thereto and the terminal may include various devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which UE or an MS transmits data or a control signal to a BS (e.g., eNB), and the DL refers to a radio link through which a BS transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

A minimum transmission unit in a time domain is an OFDM symbol, and N OFDM symbols may configure one slot and two slots may configure one subframe. The length of a slot may be 0.5 ms and the length of a subframe may be 1.0 ms.

In an existing LTE technology, DL transmission and UL transmission are performed in one carrier during time division duplexing (TDD), and a carrier for DL transmission and a carrier for UL transmission are present during frequency division duplexing (FDD).

Thereafter, with the introduction of carrier aggregation (CA) technology to the LTE technology, several carriers became usable when one BS and one terminal communicate with each other. However, even when several carriers are used, an operation of DL HARQ feedback transmission or a random access process are performed only in one fixed carrier.

Meanwhile, an LTE system is a system in which an operator communicates using a licensed band frequency assigned by the government or the like, but to satisfy recently increasing traffic demand, technical discussions for using the LTE technology in an unlicensed band currently used for a wireless local area network (LAN), Bluetooth, or the like are in progress.

The unlicensed band may denote a communication frequency band available to anyone, such as 2.4 GHz, 5 GHz, or the like. The unlicensed band may be a relative concept with respect to the licensed band allowed as a mobile communication frequency. However, the unlicensed band is not limited thereto, and may denote different frequency bands, according to nations, policies, and the like.

Unlike a communication technology using the licensed band, various technologies coexist in an unlicensed band communication technology, and thus various restrictions may be present to use the unlicensed band. One of the restrictions is a listen-before-talk (LBT) operation. The LBT operation denotes an operation of verifying whether a channel is empty before using the channel. A BS or a terminal of the LTE system needs to perform the LBT operation first so as to access a channel in the unlicensed band.

A communication node (i.e., a device such as a BS or a terminal) configuring a wireless communication network may transmit a signal based on the LBT operation in the unlicensed band. The communication node may perform an energy detection operation to determine an occupied state of the unlicensed band. The communication node may transmit a signal when it is determined that the unlicensed band is in an idle state. On the other hand, the communication node may not transmit a signal when it is determined that the unlicensed band is in a busy state.

Hereinafter, when it is said that 'LBT is performed', it is verified whether a channel is in an idle state or whether another node is using the channel. Also, when it is said that 'LBT succeeded' in a channel, it means that the channel is in an idle state based on a result of the LBT.

There are a licensed-assisted access (LAA) and MulteFire as technologies for using an LTE communication technology in the unlicensed band.

The LAA is a technology of additionally using the unlicensed band for a DL purpose together with LTE operating in the licensed band. eLAA is a technology defined by 3GPP Release 14 and allows the unlicensed band to be used even for UL transmission, based on LAA. FeLAA is a technology defined by 3GPP Release 15 and proposes autonomous UL for preventing a large delay time of UL transmission raised in existing LAA and eLAA.

MulteFire is a technology under standardization by MulteFire alliance and is an LTE technology operating only in the unlicensed band like WiFi, unlike LAA using the licensed band as an anchor carrier. MulteFire is developed based on 3GPP Release 13 and 3GPP Release 14.

Meanwhile, because LAA and MulteFire are developed based on the LTE technology provided to operate in the licensed band, LAA and MulteFire do not sufficiently consider features of the unlicensed band. For example, because the random access process or DL HARQ feedback transmission is performed in one carrier, when the carrier that performs the random access process or DL HARQ feedback transmission is busy with other communication technologies, it is difficult for LBT to succeed, thereby largely delaying communication.

The disclosure provides a method of effectively communicating in an unlicensed band by performing wireless communication using multiple channels in the unlicensed band.

FIG. 1 illustrates a diagram for describing an example of a wireless communication system supporting an unlicensed band, according to some embodiments of the disclosure.

Referring to FIG. 1, a UE 101 may use both LTE and 5G communication methods. A BS 102 may be an eNodeB that is an LTE BS or a gNodeB that is a next-generation BS using an NR communication method. When the UE 101 uses an LTE communication method, the UE 101 may be connected to the gNodeB that is the LTE BS and the eNodeB may be connected to an evolved packet core (EPC) that is a core network of an LTE communication system.

Also, when the UE 101 uses a next-generation mobile communication method (NR communication method), the UE 101 may be connected to the gNodeB that is the next-generation BS and the gNodeB may be connected to a 5G core that is a core network of an NR communication system. The NR system may also be referred to as a 5G system and hereinafter, 5G and NR may be interchangeably used.

Also, it would be obvious to one of ordinary skill in the art that the UE 101 may also interwork with an NR communication LTE system. According to some embodiments of the disclosure, the UE 101 may use the NR communication system and the LTE communication system together, and may use the NR communication system and the LTE communication system simultaneously by using a function such as LTE-NR dual connectivity.

According to some embodiments of the disclosure, connection between the UE 101 and the BS 102 is referred to as a radio access network (RAN), and the BS 102 may be connected to a core network and access a data network (for example, a data server, the Internet, or the like) via data processes of entities in the core network.

According to some embodiments of the disclosure, because all user traffic is serviced through a shared channel in the LTE or NR communication system, an apparatus that performs scheduling by collecting status information, such as a buffer status, an available transmission power status, and a channel status, of the UEs 101 is required, wherein the apparatus may be the BS 102. One BS 102 may generally control a plurality of cells and may use OFDM as wireless connection technology, and may use beamforming technology. The BS 102 may also use adaptive modulation & coding (AMC) to determine a modulation scheme and a channel coding rate in accordance with the channel status.

Hereinafter, a channel may denote a bandwidth part (BWP) considered in a 3GPP NR. In other words, the BWP may denote a partial frequency band among an entire system frequency band. Also, the channel may denote a carrier in a 3GPP LTE.

Hereinafter, the channel may denote a control channel or a data channel. The control channel may denote a channel through which the BS 102 and the UE 101 transmit and receive a control signal and a data signal. Also, the control channel may denote an anchor carrier considered in the 3GPP LTE. Also, the control channel may denote an initial BWP considered in a 3GPP NR. The data channel may denote a channel through which the BS 102 and the UE 101 transmit and receive a data signal.

Hereinafter, the channel may denote a channel in an unlicensed band but is not limited thereto.

According to some embodiments of the disclosure, classification of the control channel and the data channel may be determined by the BS 102.

Figure 2:
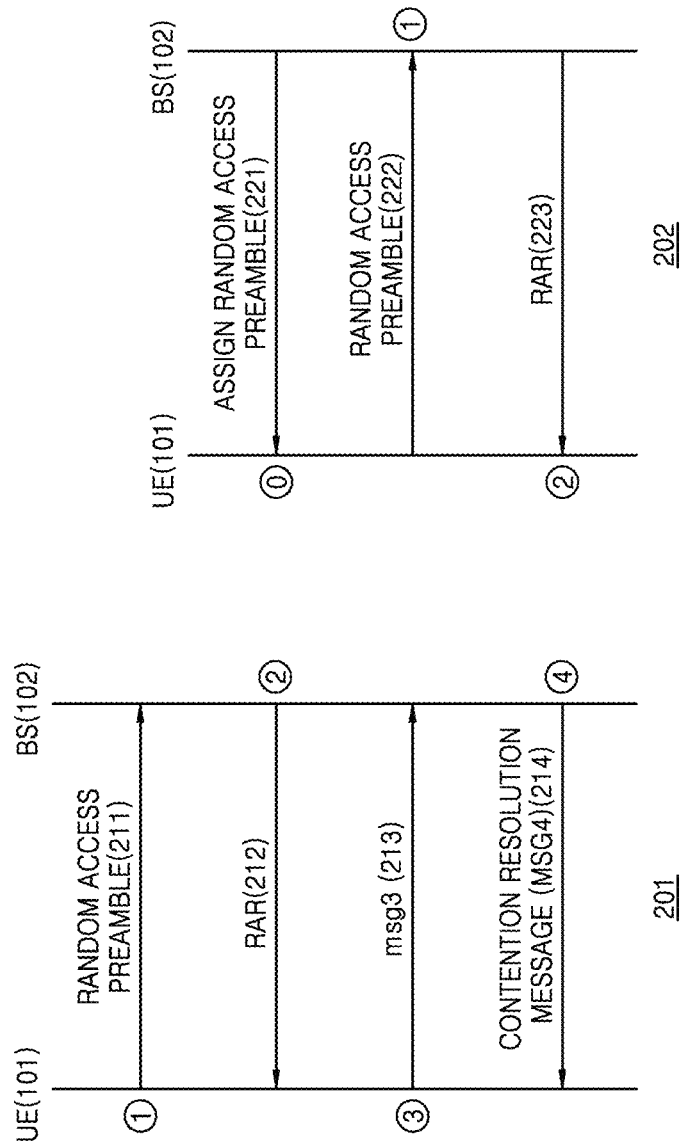
FIG. 2 illustrates a diagram for describing procedures of a user equipment (UE) performing a random access, according to some embodiments of the disclosure.

FIG. 2 illustrates a diagram for describing procedures of the UE 101 performing a random access on the BS 102, according to some embodiments of the disclosure.

In FIG. 2, reference numeral 201 indicates procedures of a contention-based 4-step random access and reference numeral 202 indicates procedures of a contention-free random access.

The random access is divided into a contention-based random access and a contention-free random access.

The contention-based random access is a process performed by the UE 101 that accesses the BS 102 for the first time, and may be performed in 4 steps or 2 steps.

Referring to the procedures 201 of FIG. 2, during the contention-based 4-step random access, a total of four messages (a random access preamble, a random access response (RAR), a third message (msg3), and a fourth message (msg4)) are transmitted and received between the UE 101 and the BS 102.

The UE 101 may transmit the random access preamble through a physical channel for a random access, to access the BS 102 (operation 211). The random access preamble may also be referred to as a first message (msg1). The physical channel for a random access is referred to as a physical random access channel (PRACH), and one or more UEs 101 may simultaneously transmit the random access preamble through PRACH resources. The PRACH resources may span over one subframe or only some symbols in one subframe may be used. Information about the PRACH resources is included in system information broadcast by the BS 102, and the UE 101 may verify which time frequency resources are to be used to transmit a preamble. Also, the random access preamble is a specific sequence specially designed to be receivable even when transmitted before being completely synchronized with the BS 102, and may include a plurality of preamble identifiers (indexes).

Upon receiving the random access preamble, the BS 102 may transmit the RAR to the UE 101 in response to the random access preamble (operation 212). The RAR may also be referred to as a second message (msg2). The RAR may include at least one of identifier information of the transmitted random access preamble, uplink transmission timing correction information, uplink resource assignment information to be used afterward, or temporary UE identifier information. The identifier information of the random access preamble may be transmitted, for example, when a plurality of UEs transmit different preambles to attempt random access, to notify to which preamble the RAR corresponds. The uplink resource assignment information is information about resources to be used when the UE 101 transmits the msg3, and may include physical locations and sizes of the resources, a modulation and coding scheme (MCS) used during transmission, and power adjustment information during transmission. The temporary UE identifier information is a value transmitted to be used because the UE 101 that transmitted a preamble does not include an identifier assigned by the BS 102 to communicate with the BS 102 when the UE 101 first accesses the BS 102.

The RAR is to be transmitted within a certain period starting from a certain time after the random access preamble is transmitted, and such a period is referred to as a 'RAR window'. The RAR window starts from a point of time when a certain time is passed after the first random access preamble is transmitted. The certain time may have a subframe unit (1 ms) or less. The length of the RAR window may be a certain value set by the BS 102 for each PRACH resource or for at least one PRACH resource sets within a system information message broadcast by the BS 102.

Meanwhile, when the RAR is transmitted, the BS 102 schedules the RAR through PDCCH and scheduling information may be scrambled by using a random access-radio network temporary identifier (RA-RNTI). When the RA-RNTI is mapped to the PRACH resources used to transmit the random access preamble, the UE 101 that transmitted the random access preamble with a certain PRACH resource may determine whether there is an RAR transmitted to the UE 101 by attempting to receive PDCCH based on the RA-RNTI. In other words, when the RAR is a response to the random access preamble transmitted by the UE 101 as in the procedures 201 of FIG. 1, the RA-RNTI used for the scheduling information of the RAR may include information about the random access preamble transmitted by the UE 101.

Upon receiving the RAR, the UE 101 may transmit the msg3 to the resources assigned by the RAR (operation 213). Examples of the msg3 transmitted by the UE 101 may include an RRCConnetionRequest message that is a message of an RRC layer for initial connection, an RRCConnectionReestablishmentRequest message for reconnection, and an RRCConnectionReconfigurationComplete message for handover. As another example, upon receiving the RAR, the UE 101 may transmit a buffer status report (BSR) message for a resource request. In other words, the msg3 may indicate at least one of the RRCConnectionRequest message, the RRCConnectionReestablishmentRequest message, the RRCConnectionReconfigurationComplete message, or the BSR message for a resource request, but is not limited thereto.

Then, the UE 101 may receive a contention resolution message from the BS 102 (operation 214) during the initial transmission (that is, when the msg3 does not include the identifier information that is pre-assigned to the UE 101 by the BS 102). The contention resolution message may be referred to as the msg4. The contention resolution message may include all content transmitted by the UE 101 via the msg3. Accordingly, the BS 102 may identify with respect to which terminal the msg4 is a response to the msg3.

Compared to 4-step procedures, a 2-step contention-based random access does not include the transmitting and receiving of the msg3 and msg4, and includes 2 steps as additional information is included in the msg1 and msg2. The additional information may include information about whether the UE 101 retransmitted the msg1 and bandwidth size information supported by the UE 101. The 2-step contention-based random access is completed when the UE 101 successfully performs decoding by receiving the RAR from the BS 102.

In the procedures 202 of the contention-free random access, the UE 101 may be assigned with resources for communication without contention with another terminal by being assigned with the random access preamble from the BS 102 (operation 221) and performing a random access by using the assigned random access preamble (operations 222 and 223). The contention-free random access may be performed when the UE 101 performs handover or uplink synchronization with the reconnected BS 102. For example, during the handover, the BS 102 may assign, to the UE 101, a random access preamble dedicated to the UE 101.

Figure 3:
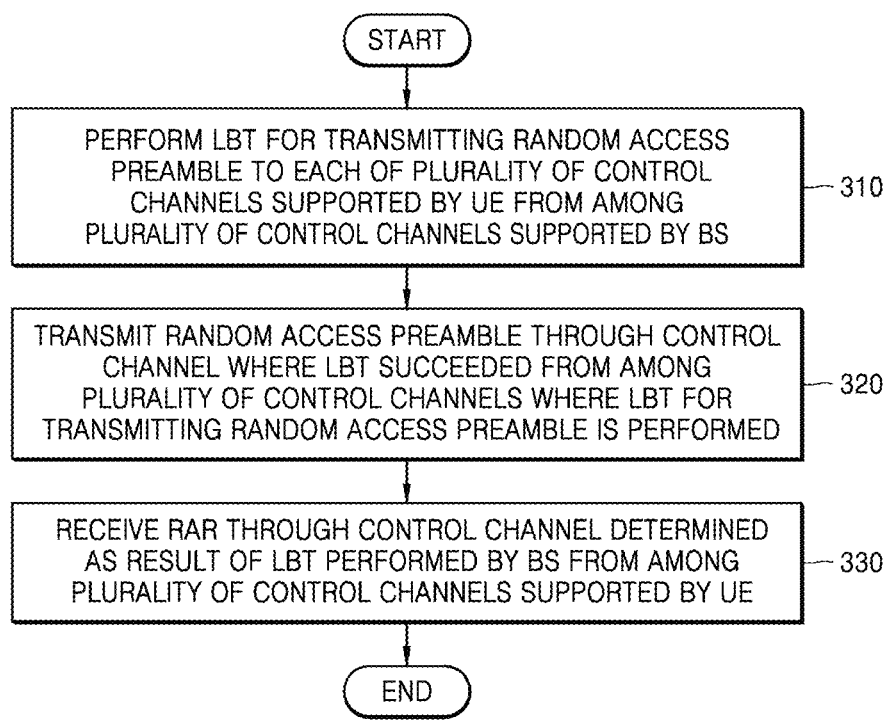
FIG. 3 illustrates a flowchart of a method, performed by a UE, of communicating with a base station by using multiple channels in a wireless communication system supporting an unlicensed band, according to some embodiments of the disclosure.

FIG. 3 illustrates a flowchart of a method, performed by a UE, of communicating with a BS by using multiple channels in a wireless communication system supporting an unlicensed band, according to some embodiments of the disclosure.

In operation 310, the UE may perform listen-before-talk (LBT) for transmitting a random access preamble for each of a plurality of control channels supported by the UE from among a plurality of control channels supported by the BS.

According to some embodiments of the disclosure, the UE may receive information of the plurality of control channels supported by the BS, from the BS. For example, the UE may identify the control channels supported by the BS by receiving, from the BS, a system information block (SIB) or a physical broadcasting channel (PBCH) including the information of the control channels supported by the BS. A method, performed by the UE, of receiving the information of the plurality of control channels supported by the BS, will be described in detail below with reference to FIGS. 4 and 6.

According to some embodiments of the disclosure, the UE may support at least two control channels from among the control channels supported by the BS. The UE may perform (i.e. attempt) LBT for transmitting the random access preamble on each of the at least two control channels.

In operation 320, the UE may transmit the random access preamble through a control channel where the LBT succeeded from among the plurality of control channels where the LBT for transmitting the random access preamble is performed (i.e. attempted).

According to some embodiments of the disclosure, the UE may generate the random access preamble, based on which control channel the UE supports from among the plurality of control channels supported by the BS. In other words, the random access preamble generated by the UE may include information of the plurality of control channels supported by the UE from among the plurality of control channels supported by the BS. A method, performed by the UE, of generating the random access preamble will be described in detail below with reference to FIGS. 4 and 6.

According to some embodiments of the disclosure, the number of control channels where the LBT succeeded from among the plurality of control channels where the LBT for transmitting the random access preamble generated by the UE is performed may be one or more. For example, when there is one control channel where the LBT succeeded, the UE may transmit the random access preamble through such a control channel. Also, for example, when there are two or more control channels where the LBT succeeded, the UE may select at least one control channel among the two or more control channels and transmit the random access preamble through the selected control channel.

For example, the UE may transmit the random access preamble through a control channel where the LBT succeeded first from among the two or more control channels where the LBT succeeded. Also, the UE may transmit the random access preamble through one of control channels randomly selected from among the two or more control channels where the LBT succeeded. Also, the UE may transmit the random access preamble by using two or more control channels from among the two or more control channels where the LBT succeeded.

Also, for example, the UE may select at least one control channel among the two or more control channels where the LBT succeeded, based on priorities considered when determining a control channel for transmitting the random access preamble, and transmit the random access preamble through the selected control channel. A method, performed by the UE, of transmitting the random access preamble based on the priorities will be described in detail below with reference to FIG. 10.

In operation 330, the UE may receive a random access response (RAR) through a control channel determined as a result of LBT performed by the BS from among the plurality of control channels supported by the UE.

According to some embodiments of the disclosure, the BS may receive the random access preamble transmitted by the UE. The BS may identify which control channel the UE supports from among the plurality of control channels supported by the BS, based on information included in the random access preamble.

According to some embodiments, the BS may perform LBT for transmitting RAR on each of the plurality of control channels supported by the UE from among the plurality of control channels supported by the BS, i.e., to each of the plurality of control channels of the BS supported by the UE. The BS may determine at least one of control channels where the LBT succeeded as a control channel for transmitting the RAR. For example, the BS may determine a control channel where the LBT first succeeded as the control channel for transmitting the RAR. The BS may transmit the RAR through the determined control channel. The UE may receive the RAR through the control channel determined as the result of LBT performed by the BS.

According to some embodiments of the disclosure, the RAR received by the UE may include identification (ID) information of the control channel through which the UE transmitted the random access preamble. For example, the RAR may include a channel ID field of the control channel. The UE may determine whether the RAR is received by using the ID information of the control channel. This will be described in detail below with reference to FIGS. 6 and 8.

According to a method of using an LTE technology in an existing unlicensed band, a random access is performed through one channel. Accordingly, when the one channel where the random access is to be performed is congested due to other communication technologies operating in the unlicensed band and when LBT does not succeed in the channel, a communication delay time is largely increased and communication reliability is decreased. According to the disclosure, when a wireless communication system supporting an unlicensed band performs a random access by using multiple channels, a communication delay time in the unlicensed band may be reduced and communication reliability may be increased. In other words, a UE and a BS according to the disclosure may transmit a message through another non-congested channel where LBT succeeded, even when certain channels are congested, thereby reducing damage caused by other communications operating in an unlicensed band.

Also, according to some embodiments of the disclosure, when there is one control channel of a BS supported by a UE, the UE may perform LBT for transmitting a random access preamble on the one control channel and transmit the random access preamble through the one control channel when the LBT succeeds. The UE may receive an RAR through the one control channel. In other words, the operations described herein may also be applied to a case where there is one control channel.

Figure 4:
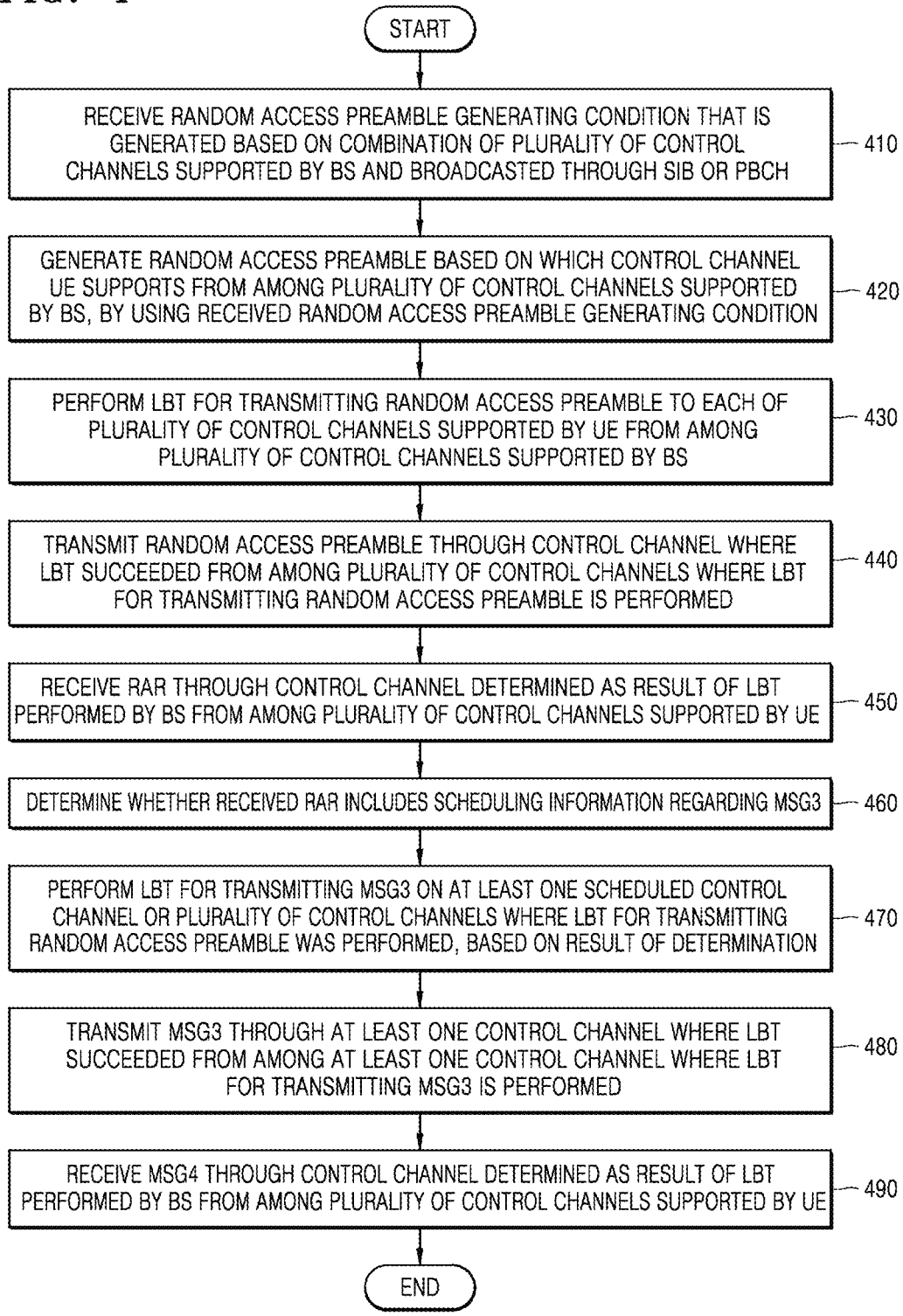
FIG. 4 illustrates a flowchart of a method, performed by a UE, of performing a contention-based 4-step random access on a base station by using multiple channels, according to some embodiments of the disclosure.

FIG. 4 illustrates a flowchart of a method, performed by a UE, of performing a competition-based 4-step random access on a BS by using multiple channels, according to some embodiments of the disclosure.

In operation 410, the UE may receive a random access preamble generating condition that is generated based on a combination of a plurality of control channels supported by the BS and broadcast through a SIB or PBCH.

According to some embodiments of the disclosure, the BS may transmit, to the UE, the random access preamble generating condition including information of the plurality of control channels supported by the BS.

According to some embodiments of the disclosure, for example, the BS may differently map a root index of a Zadoff-Chu (ZC) sequence for each of all combinations generable from sets of the plurality of control channels supported by the BS. The BS may store mapped information as a table. Also, the BS may generate an equation having a rule for differently mapping the root index of the ZC sequence for each combination.

Also, the BS may differently assign a preamble signature of the ZC sequence for each combination. For example, the random access preamble generating condition may denote the stored table, the generated equation, or the assigned preamble signature. The BS may transmit the random access preamble generating condition, i.e., the stored table, the generated equation, or the assigned preamble signature of the ZC sequence, to the UE by broadcasting the random access preamble generating condition in a SIB or PBCH. The UE may receive the broadcast random access preamble generating condition.

According to some embodiments of the disclosure, the random access preamble generating condition may be pre-stored in the UE.

According to some embodiments of the disclosure, a method, performed by the BS, of generating the random access preamble generating condition according to the combination of the control channels supported by the BS will be described in detail below with reference to FIG. 6.

In operation 420, the UE may generate a random access preamble based on which control channel the UE supports from among the plurality of control channels supported by the BS, by using the received random access preamble generating condition.

According to some embodiments of the disclosure, the UE may identify the plurality of control channels supported by the BS, based on the received random access preamble generating condition. Also, the UE may identify which control channel the UE supports from among the plurality of control channels supported by the BS. For example, the UE may identify all combinations of the control channels supported by the BS, based on the table including information in which the root index of the ZC sequence is differently mapped according to the combination of the control channels supported by the BS, the equation having the mapping rule described above, or the differently assigned preamble signature of the ZC sequence. The UE may identify the plurality of control channels supported by the BS, based on all the combinations of the control channels supported by the BS. The UE may identify the plurality of control channels of the BS supported by the UE by comparing the plurality of control channels supported by the BS and a control channel supported by the UE.

According to some embodiments of the disclosure, the UE may generate the random access preamble based on which control channel the UE supports from among the plurality of control channels supported by the BS, by using the random access preamble generating condition pre-stored in the UE. A detailed method, performed by the UE, of generating the random access preamble is similar to that described above, and thus descriptions thereof are omitted.

According to some embodiments of the disclosure, the UE may generate the random access preamble according to the plurality of control channels of the BS supported by the UE. For example, the UE may identify the root index of the ZC sequence mapped to or the preamble signature of the ZC sequence assigned to the combination of the plurality of control channels of the BS supported by the UE, based on the random access preamble generating condition. The UE may generate the random access preamble by using the mapped root index of the ZC sequence or the assigned preamble signature of the ZC sequence.

According to some embodiments of the disclosure, a method, performed by the UE, of generating the random access preamble by using the random access preamble generating condition will be described in detail below with reference to FIG. 6.

Because operations 430 to 450 of FIG. 4 are the same as operations 310 to 330 of FIG. 3, operations 430 to 450 will be briefly described. In operation 430, the UE performs LBT for transmitting the random access preamble on each of the plurality of control channels supported by the UE from among the plurality of control channels supported by the BS, and in operation 440, the UE may transmit a random access preamble through a control channel where the LBT succeeded from among the plurality of control channels where the LBT for transmitting the random access preamble is performed. In operation 450, the UE may receive RAR through a control channel determined as a result of the LBT performed by the BS from among the plurality of control channels supported by the UE.

In operation 460, the UE may determine whether the received RAR includes scheduling information regarding msg3.

According to some embodiments of the disclosure, the RAR received by the UE may include the scheduling information regarding the msg3 to be transmitted by the UE. For example, the received RAR may include information assigning at least one control channel through which the UE is to transmit the msg3. According to some embodiments of the disclosure, the RAR received by the UE may not include the scheduling information regarding the msg3 to be transmitted by the UE.

In operation 470, the UE may perform LBT for transmitting the msg3 on at least one scheduled control channel or the plurality of control channels where LBT for transmitting the random access preamble was performed, based on a result of determining whether the received RAR includes the scheduling information regarding the msg3.

According to some embodiments of the disclosure, when the received RAR includes the information assigning the control channel through which the UE is to transmit the msg3, the UE may perform the LBT for transmitting the msg3 on the assigned control channel.

According to some embodiments of the disclosure, when the received RAR includes the information assigning the plurality of control channels through which the UE is to transmit the msg3, the UE may perform the LBT for transmitting the msg3 on each of the assigned plurality of control channels.

According to some embodiments of the disclosure, when the received RAR does not include the scheduling information regarding the msg3 to be transmitted by the UE, the UE may perform the LBT for transmitting the msg3 on each of the plurality of control channels of the BS supported by the UE.

In operation 480, the UE according to some embodiments of the disclosure may transmit the msg3 through at least one control channel where the LBT succeeded from among the at least one control channel where the LBT for transmitting the msg3 is performed in operation 470. For example, the UE may transmit the msg3 through a control channel where the LBT succeeded first.

According to some embodiments of the disclosure, the UE may transmit a plurality of random access preambles, receive a plurality of RARs, and transmit a plurality of msg3. This will be described in detail below with reference to FIG. 11.

In operation 490, the UE may receive msg4 through a control channel determined as a result of the LBT performed by the BS from among the plurality of control channels supported by the UE.

According to some embodiments of the disclosure, the BS may perform the LBT for transmitting the msg4 on each of the plurality of control channels of the BS supported by the UE. The BS may determine at least one of the control channels where the LBT succeeded as a control channel for transmitting the msg4. For example, the BS may determine a control channel where the LBT succeeded first as the control channel for transmitting the msg4. The BS may transmit the msg4 through the determined control channel. The UE may receive the msg4 through the control channel determined as a result of the LBT performed by the BS. When decoding of the received msg4 succeeds, the competition-based 4-step random access is completed.

Figure 5:
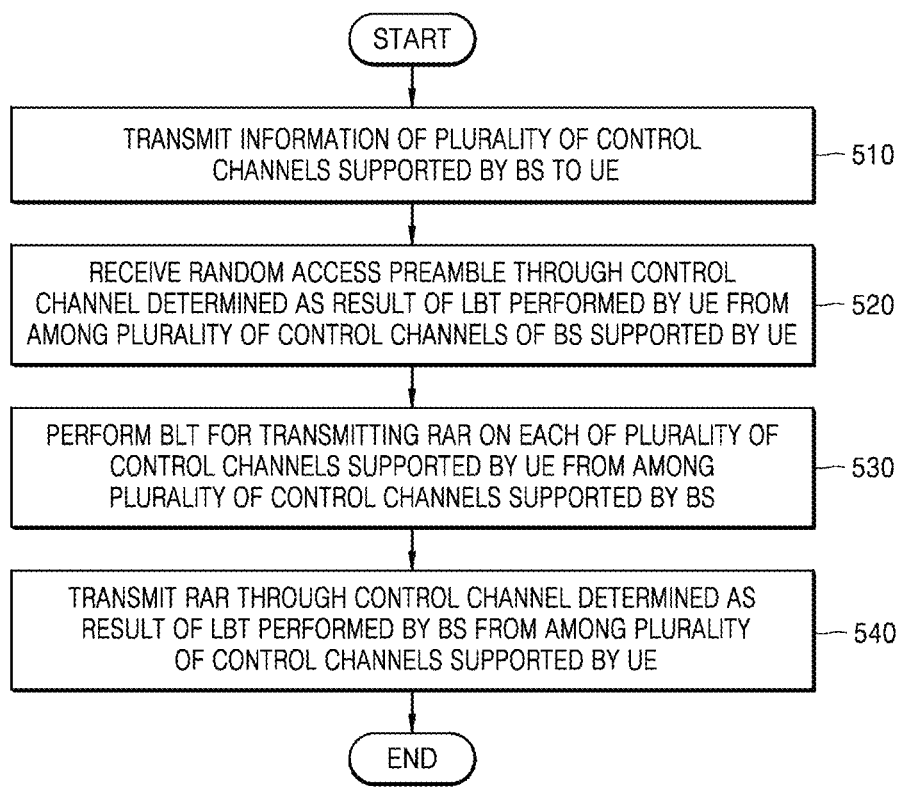
FIG. 5 illustrates a flowchart of a method, performed by a base station, of communicating with a UE by using multiple channels in a wireless communication system supporting an unlicensed band, according to some embodiments of the disclosure.

FIG. 5 illustrates a flowchart of a method, performed by a BS, of communicating with a UE by using multiple channels in a wireless communication system supporting an unlicensed band, according to some embodiments of the disclosure.

In operation 510, the BS may transmit information of a plurality of control channels supported by the BS to the UE. Details about operation 510 correspond to those of operation 410 of FIG. 4.

In operation 520, the BS may receive a random access preamble through a control channel determined as a result of LBT performed by the UE from among pluralities of control channels supported by the UE and BS, i.e., from among the plurality of control channels of the BS supported by the UE. Details about operation 520 correspond to those of operations 310 and 320 of FIG. 3 and operation 420 of FIG. 4.

In operation 530, the BS may perform LBT for transmitting RAR on each of the plurality of control channels supported by the UE from among the plurality of control channels supported by the BS.

In operation 540, the BS may transmit RAR through a control channel determined as a result of the LBT performed by the BS from among the plurality of control channels supported by the UE. Details about operations 530 and 540 correspond to those of operation 330 of FIG. 3 and operation 450 of FIG. 4.

Figure 6:
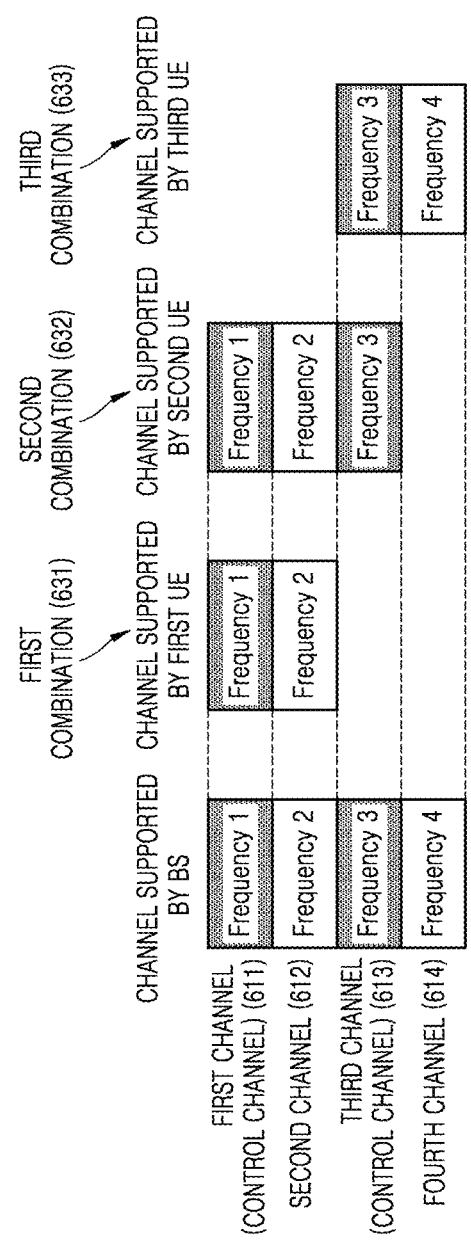
FIG. 6 illustrates a diagram for describing a method, performed by a base station, of generating a random access preamble generating condition according to a combination of control channels supported by the base station, according to some embodiments of the disclosure.

FIG. 6 illustrates a diagram for describing a method, performed by a BS, of generating a random access preamble generating condition according to a combination of control channels supported by the BS, according to some embodiments of the disclosure.

Referring to FIG. 6, for example, the BS according to some embodiments of the disclosure may support a first channel 611, a second channel 612, a third channel 613, and a fourth channel 614, and the first and third channels 611 and 613 may be control channels. Accordingly, all combinations generable from a set of a plurality of control channels supported by the BS may be a first combination 631 including only the first channel 611, a second combination 632 including the first channel 611 and the third channel 613, and a third combination 633 including the third channel 613. For example, the BS may map a first root index of a ZC sequence to the first combination 631, a second root index of the ZC sequence to the second combination 632, and a third root index of the ZC sequence to the third combination 633.

Also, for example, the BS may assign one of preamble signatures 0 to 22 to the first combination 631, one of preamble signatures 23 to 44 to the second combination 632, and one of preamble signatures 45 to 63 to the third combination 633. In FIG. 6, the number of control channels supported by the BS is two, but for example, there may be 64 preamble signatures of the ZC sequence and the BS may assign different preamble signatures to each combination of a plurality of control channels supported by the BS. However, the disclosure is not limited thereto.

Referring to FIG. 6, combinations of a plurality of control channels of the BS supported by first to third UEs are respectively the first combination 631, the second combination 632, and the third combination 633. The second UE may generate a random access preamble by using, for example, the second root index of the ZC sequence mapped to the second combination 632 or one of the preamble signatures 23 to 44 of the ZC sequence assigned to the second combination 632. Because a method, performed by the first UE and the third UE, of generating a random access preamble is easily understood from the example of the second UE, details thereof will be omitted.

Figure 7:
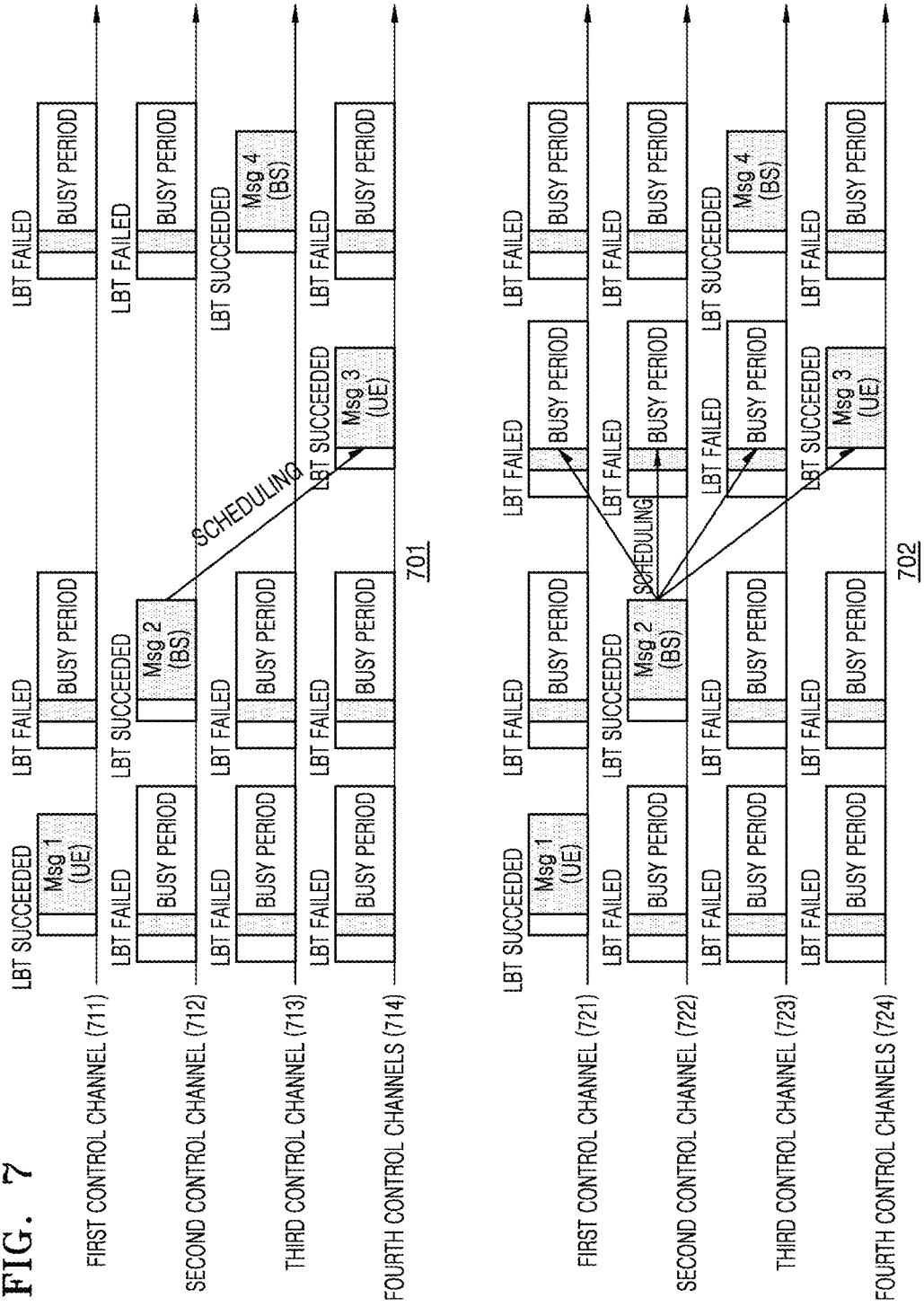
FIG. 7 illustrates a diagram for describing an example of a method, performed by a UE, of performing a contention-based 4-step random access on a base station by using multiple channels, according to some embodiments of the disclosure.

FIG. 7 illustrates a diagram for describing an example of a method, performed by a UE, of performing a competition-based 4-step random access on a BS by using multiple channels, according to some embodiments of the disclosure.

Referring to reference numeral 701 of FIG. 7, first control channel 711 to fourth control channel 714 are illustrated as a plurality of control channels of the BS supported by the UE. The UE transmitted a random access preamble (msg1) to the BS through the first control channel 711 where LBT succeeded, and the BS transmitted an RAR (msg2) to the UE through the second control channel 712 where LBT succeeded. An RAR received by the UE includes scheduling information designating the fourth control channel 714 through which the UE transmits msg3. The UE performs LBT for the msg3 on the designated fourth control channel 714, and transmits the msg3 when the LBT succeeds. The UE receives msg4 through the third control channel 713 determined as a result of LBT performed by the BS.

Referring to reference numeral 702 of FIG. 7, an RAR received by the UE includes scheduling information designating a first control channel 721, a second control channel 722, a third control channel 723, and a fourth control channel 724 as a plurality of control channels through which the UE transmits msg3. The UE performs LBT for transmitting msg3 on each of the designated first to fourth control channels 721 to 724, and transmits the msg3 through the fourth control channel 724 where the LBT succeeded first. The UE receives msg4 through the third control channel 723 determined as a result of LBT performed by the BS. Also, the RAR received by the UE may not include the scheduling information regarding the msg3 to be transmitted by the UE. In this case, the UE performs LBT for transmitting msg3 on each of the first to fourth control channels 721 to 724 that are the plurality of control channels of the BS supported by the UE, and transmits the msg3 through the fourth control channel 724 where the LBT succeeded first. The UE receives msg4 through the third control channel 723 determined as a result of LBT performed by the BS.

FIG. 8 illustrates a diagram for describing a RAR including identification information of a control channel through which a UE transmitted a random access preamble, according to some embodiments of the disclosure.

According to some embodiments of the disclosure, a BS may receive random access preambles generated by using the same root index of a ZC sequence or the same preamble signature of the ZC sequence respectively from two UEs through different control channels at the same time.

For example, a first UE may transmit a first random access preamble to the BS through a first control channel, and at substantially the same time as when the first random access preamble is transmitted, a second UE may transmit, to the BS, a second random access preamble generated by using the same root index of a ZC sequence or the same preamble signature of the ZC sequence as the first random access preamble, through a second control channel.

As described with reference to FIG. 6, when a combination of control channels of the BS supported by the first UE and the second UE is the second combination 632, and when the first UE transmits the first random access preamble through the first channel 611 and the second UE transmits the second random access preamble through the third channel 613 at the same time, root indexes or preamble signatures of ZC sequences of the first and second random access preambles may be the same. When the first UE and the second UE receive an RAR regarding the same preamble signature, the first UE and the second UE need to identify whether the received RAR was transmitted to itself.

According to some embodiments of the disclosure, in order for a UE to identify whether an RAR is transmitted to itself under such a situation, the RAR received by the UE may include ID information of a channel through which the UE transmitted a random access preamble. For example, as shown in FIG. 8, the RAR may include a channel ID of a channel through which the UE transmitted the random access preamble. For example, the channel ID may be differently set for each channel supported by the UE. Also, the UE may transmit the random access preamble by including, in the random access preamble, the channel ID of the channel through which the random access preamble is transmitted.

Also, according to some embodiments of the disclosure, a BS may identify a control channel through which a received random access preamble is transmitted, and transmit an RAR by including, in the RAR, a channel ID of the control channel. The UE may compare the channel ID included in the received RAR and the channel ID of the channel through which the UE transmitted the random access preamble to determine whether the RAR is received by the UE.

According to some embodiments of the disclosure, in order for the UE to identify whether the RAR was transmitted to itself in such a situation, RA-RNTI may be determined in consideration of the ID information of the channel through which the UE transmitted the random access preamble. When the RAR is transmitted, the BS schedules the RAR through PDCCH and scheduling information may be scrambled by using RA-RNTI. As RA-RNTI is mapped to a PRACH resource used to transmit the random access preamble, the UE that transmitted the random access preamble with a certain PRACH resource attempts to receive PDCCH based on RA-RNTI to determine whether a RAR transmitted to the UE is present.

For example, RA-RNTI may be defined according to Equation 1 below.

$$\text{RA-RNTI} = 1 + t_{id} + 10 * c_{id} \quad \text{Equation 1}$$

Here, $t_{id}$ denotes an index of a first subframe of a PRACH resource transmitted with a random access preamble is transmitted and may have a value from 0 to less than 6, $c_{id}$ denotes channel ID of a channel through which the random access preamble is transmitted, and for example, when the number of control channels is N, $c_{id}$ may have a value from 0 to N−1 or from 0 to $2^N-1$.

Also, for example, RA-RNTI may be defined according to Equation 2 below in consideration of $f_{id}$ used during a time division duplexing (TDD) operation of LTE.

$$\text{RA-RNTI}=1+t_{id}+10*f_{id}+10*(f_{id\_max}+1)*c_{id} \qquad \text{Equation 2}$$

Here, $t_{id}$ denotes an index of a first subframe of a PRACH transmitted with the random access preamble as described above and may have a value from 0 to less than 6, $f_{id}$ denotes an index of a PRACH resource assigned in the subframe and may have a value from 0 to less than 6, $f_{id\_max}$ denote a maximum value of $f_{id}$, and $c_{id}$ denotes a channel ID of a channel through which the random access preamble is transmitted as described above, and for example, when the number of control channels is N, $c_{id}$ may have a value from 0 to N−1 or a value from 0 to $2^N-1$.

Also, RA-RNTI may be defined according to Equation 3 below.

$$\text{RA-RNTI}=1+t_{id}+10*f_{id}+100*c_{id} \qquad \text{Equation 3}$$

Here, $t_{id}$ denotes an index of a first subframe of a PRACH transmitted with the random access preamble as described above and may have a value from 0 to less than 6, $f_{id}$ denotes an index of a PRACH resource assigned in the subframe and may have a value from 0 to less than 6, and $c_{id}$ denotes a channel ID of a channel through which the random access preamble is transmitted as described above, and for example, when the number of control channels is N, $c_{id}$ may have a value from 0 to N−1 or a value from 0 to $2^N-1$.

Also, RA-RNTI may be defined according to Equation 4 below.

$$\text{RA-RNTI}=1+t_{id}+k*f_{id}+k*l*c_{id} \qquad \text{Equation 4}$$

Here, $t_{id}$ denotes an index of a first subframe of a PRACH transmitted with the random access preamble as described above and may have a value from 0 to less than k, $f_{id}$ denotes an index of a PRACH resource assigned in the subframe and may have a value from 0 to less than 6, and $c_{id}$ denotes a channel ID of a channel through which the random access preamble is transmitted as described above, and for example, when the number of control channels is N, $c_{id}$ may have a value from 0 to N−1 or a value from 0 to $2^N-1$.

Also, for example, RA-RNTI may be defined according to Equation 5 considering an NR communication method.

$$\text{RA-RNTI}=1+s_{id}+14*t_{id}+14*80*f_{id}+14*80*8*ul_{carrier\_id}+14*80*8*2*c_{id} \qquad \text{Equation 5}$$

Here, $s_{id}$ denotes an index of a first OFDM symbol of PRACH transmitted with the random access preamble and may have a value from 0 to less than 14, $t_{id}$ denotes an index of a first slot of PRACH transmitted with the random access preamble and may have a value from 0 to less than 80, $f_{id}$ denotes an index of a frequency domain of PRACH transmitted with the random access preamble and may have a value from 0 to less than 8, $ul_{carrier\_id}$ has a value of 0 when an uplink carrier transmitted with the random access preamble is a normal uplink (NUL) carrier and a value of 1 when the uplink carrier is a supplementary uplink (SUL) carrier, and $c_{id}$ denotes a channel ID of a channel through which the random access preamble is transmitted and for example, when the number of control channels is N, $c_{id}$ may have a value from 0 to N−1 or a value from 0 to $2^N-1$.

Also, RA-RNTI may be defined according to Equation 6 below.

$$\text{RA-RNTI}=1+s_{id}+k*t_{id}+k*l*f_{id}+k*l*m*ul_{carrier\_id}+k*l*m*o*c_{id} \qquad \text{Equation 6}$$

Here, $s_{id}$ denotes an index of a first OFDM symbol of PRACH transmitted with the random access preamble and may have a value from 0 to less than k, $t_{id}$ denotes an index of a first slot of PRACH transmitted with the random access preamble and may have a value from 0 to less than 1, $f_{id}$ denotes an index of a frequency domain of PRACH transmitted with the random access preamble and may have a value from 0 to less than m, and $ul_{carrier\_id}$ has a value from 0 to less than o based on a type of an uplink carrier transmitted with the random access preamble and may be associated with an NUL carrier ID and/or an SUL carrier ID based on each value. $c_{id}$ denotes a channel ID of a channel through which the random access preamble is transmitted and for example, when the number of control channels is N, $c_{id}$ may have a value from 0 to N−1 or a value from 0 to $2^N-1$.

By using Equations 1 to 6, the UE may generate RA-RNTI by mapping control channels and IDs in a one-to-one manner, and may transmit different RA-RNTIs generated with different $c_{id}$ for each control channel. When the UE transmits two or more random access preambles by using one or more control channels, the BS may be unable to recognize that the received two or more random access preambles are from the same UE. Accordingly, the BS may set different RARs for each random access preamble and transmit the RARs.

When the UE receives two or more RARs, the UE according to some embodiments of the disclosure may determine whether the received RAR is transmitted to the UE by attempting to receive PDCCH by using RA-RNTI including the channel ID of the channel through which the UE transmitted the random access preamble as described above. For example, the UE may select one of the received RARs by using the following method and ignore the remaining RARs.

Select an RAR that is received first.

Select an RAR with the best control channel status (for example, select an RAR received through a channel with the lowest channel occupancy, the highest transmission success probability, or the highest average yield).

Also, according to some embodiments of the disclosure, when LBT succeeded with respect to at least one control channel, the UE may generate RA-RNTI including information of the control channel where the LBT succeeded in a $c_{id}$ format and notify the BS of the information about the control channel where LBT succeeded. When the number of control channels is N, the UE may set $c_{id}$ having a value from 0 to less than $2^N$. For example, $c_{id}$ may be mapped to at least one control channel according to the following rule and the UE may notify the BS that RA-RNTI is transmitted by using the mapping rule.

Values of $c_{id}$ from 0 to less than N are mapped to control channels in a one-to-one manner.

Values of $c_{id}$ from N to less than $_NC_2=(N*(N+1))/2$ are mapped to combinations of two control channels in a one-to-one manner. $_NC_2$ is the number of all cases where two out of N are selected without overlapping. For example, the combination of two control channels may be mapped to the values of $c_{id}$ in an ascending order as follows.

Control Channel: (0,1)=$c_{id}$:N,
Control Channel: (0,2)=$c_{id}$:N+1,
Control Channel: (0,N−1)=$c_{id}$:2N−2, Control Channel: $(1,2)=c_{id}$:2N−1,
Control Channel: $(N-2,N-1)=c_{id}$: $((N*(N+1))/2)-1$.

Values of $c_{id}$ from $_NC_2$ to less than $(_NC_2+_NC_3)$ are mapped to combinations of three control channels in a one-to-one manner. $_NC_3$ is the number of all cases where three out of N are selected without overlapping. For example, the combination of three control channels may be mapped to the values of $c_{id}$ in an ascending order as follows.
Control Channel: $(0,1,2)=c_{id}$: $_NC_2$,
Control Channel: $(0,1,3)=c_{id}$: $_NC_2+1$,
Control Channel: $(0,1,N-1)=c_{id}$: $_NC_2+N-3$,
Control Channel: $(0,2,3)=c_{id}$: $_NC_2+N-2$,
Control Channel: $(0,N-2,N-1)=c_{id}$: $_NC_2+N*(N-1)/2-1$,
Control Channel: $(1,2,3)=c_{id}$: $_NC_2+N*(N-1)/2$,
Control Channel: $(N-3,N-2,N-1)=c_{id}$: $(_NC_2+_NC_3)-1$, Values of $c_{id}$ from $_NC_{k-1}$ to less than $(_NC_{k-1}+_NC_k)$ are mapped to combinations of k control channels in a one-to-one manner. $_NC_k$ is the number of all cases where k out of N are selected without overlapping. k is from 1 to less than N.

Here, $_NC_1+_NC_2+ \ldots +_NC_N=2^N-1$. Accordingly, the UE may generate RA-RNTI by introducing $c_{id}$ having a value from 0 to less than $2^N$ to one of Equations 1 to 6 by using the above rule. For example, the UE may generate RA-RNTI including $c_{id}$ mapped to control channels where LBT succeeded and transmit the RA-RNTI to the BS to notify the BS about the control channels in which the UE succeeded in LBT. Also, the BS may identify the same RA-RNTI received from different control channels to transmit one RAR to one UE.

As described above, the BS may transmit one RAR to the UE even when RA-RNTI is transmitted by using the plurality of control channels. Thus, according to the disclosure, waste of reserved resources, BS RAR transmission power, and UE RAR reception power may be reduced compared to when the BS transmit a plurality of RARs to one UE with respect to different RA-RNTI.

However, the equations defining RA-RNTI are only examples and RA-RNTI including a channel ID of a channel through which the random access preamble is transmitted may be variously defined without being limited by the above equations.

Figure 9:
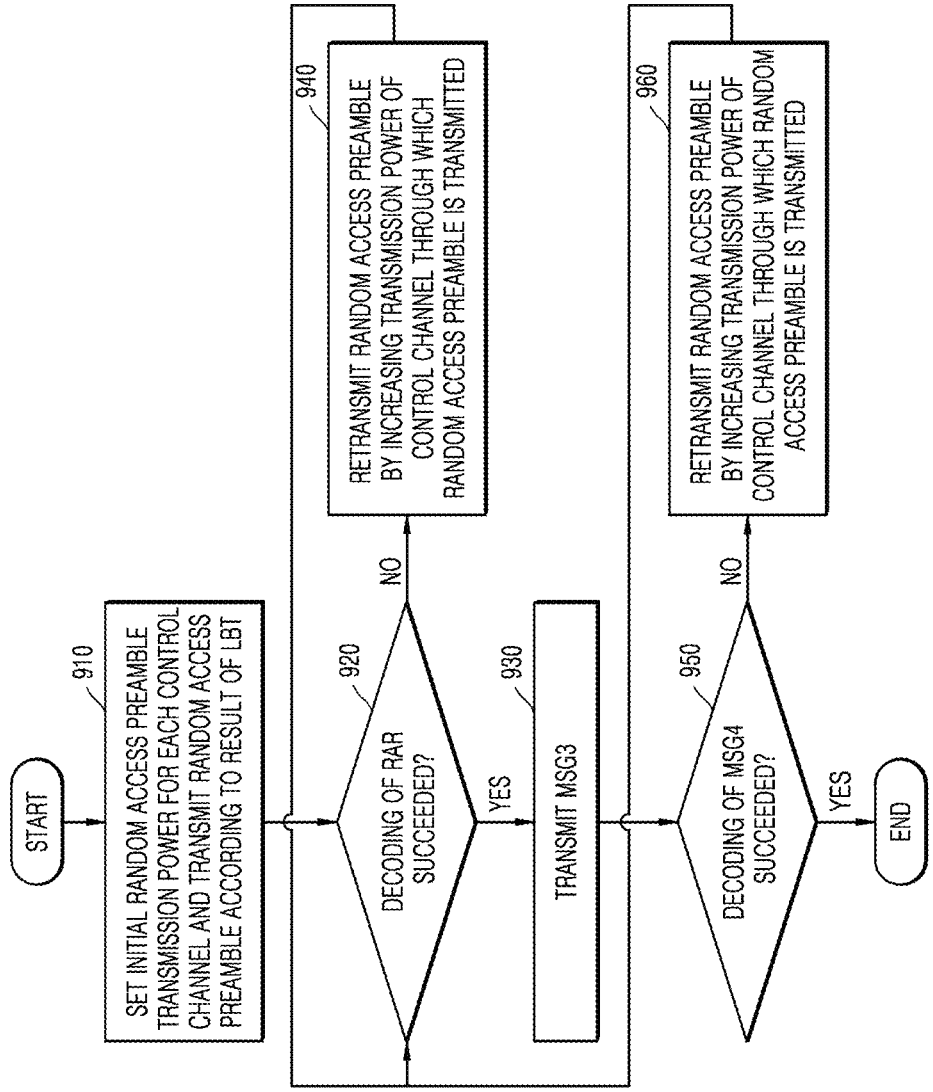
FIG. 9 illustrates a flowchart of a method, performed by a UE, of adjusting random access preamble transmission power for each control channel, according to some embodiments of the disclosure.

FIG. 9 illustrates a flowchart of a method, performed by a UE, of adjusting random access preamble transmission power for each control channel, according to some embodiments of the disclosure.

According to some embodiments of the disclosure, when the UE does not succeed in decoding RAR, the UE may retransmit a random access preamble. For example, the UE may retransmit a random access preamble to be retransmitted by increasing transmission power.

In operation 910, the UE may set initial random access preamble transmission power for each control channel and transmit a random access preamble according to a result of LBT.

For example, the initial random access preamble transmission power may be identically set for each control channel or differently set considering a channel status. The UE may transmit the random access preamble with transmission power set to a control channel through a control channel where LBT succeeded.

In operation 920, the UE may determine whether decoding of RAR succeeded.

After transmitting the random access preamble, the UE may perform an operation for receiving RAR and decode RAR during a period of an RAR window. In other words, the UE may determine whether decoding of RAR succeeded within the period of the RAR window.

In operation 930, when the UE succeeds in decoding the RAR, the UE may transmit an msg3 based on a result of LBT.

In operation 940, when the UE fails to decode the RAR, the UE may retransmit the random access preamble by increasing transmission power of the control channel through which the random access preamble is transmitted by a certain value.

Also, according to some embodiments of the disclosure, the maximum transmission power of the random access preamble transmitted by the UE may not exceed a maximum transmission power regulation of unlicensed band communication in which the UE communicates.

In operation 950, the UE may determine whether decoding of msg4 succeeded.

After transmitting the msg3, the UE may start a contention resolution timer for receiving the msg4 and perform an operation for receiving the msg4 and decoding of the msg4 within the contention resolution timer. In other words, the UE may determine whether the decoding of the msg4 succeeded within the contention resolution timer.

When the UE succeeds in decoding the msg4, the competition-based 4-step random access is completed.

In operation 960, when the UE fails to decode the msg4, the UE may retransmit the random access preamble by increasing the transmission power of the control channel through which the random access preamble is transmitted by a certain value.

Figure 10:
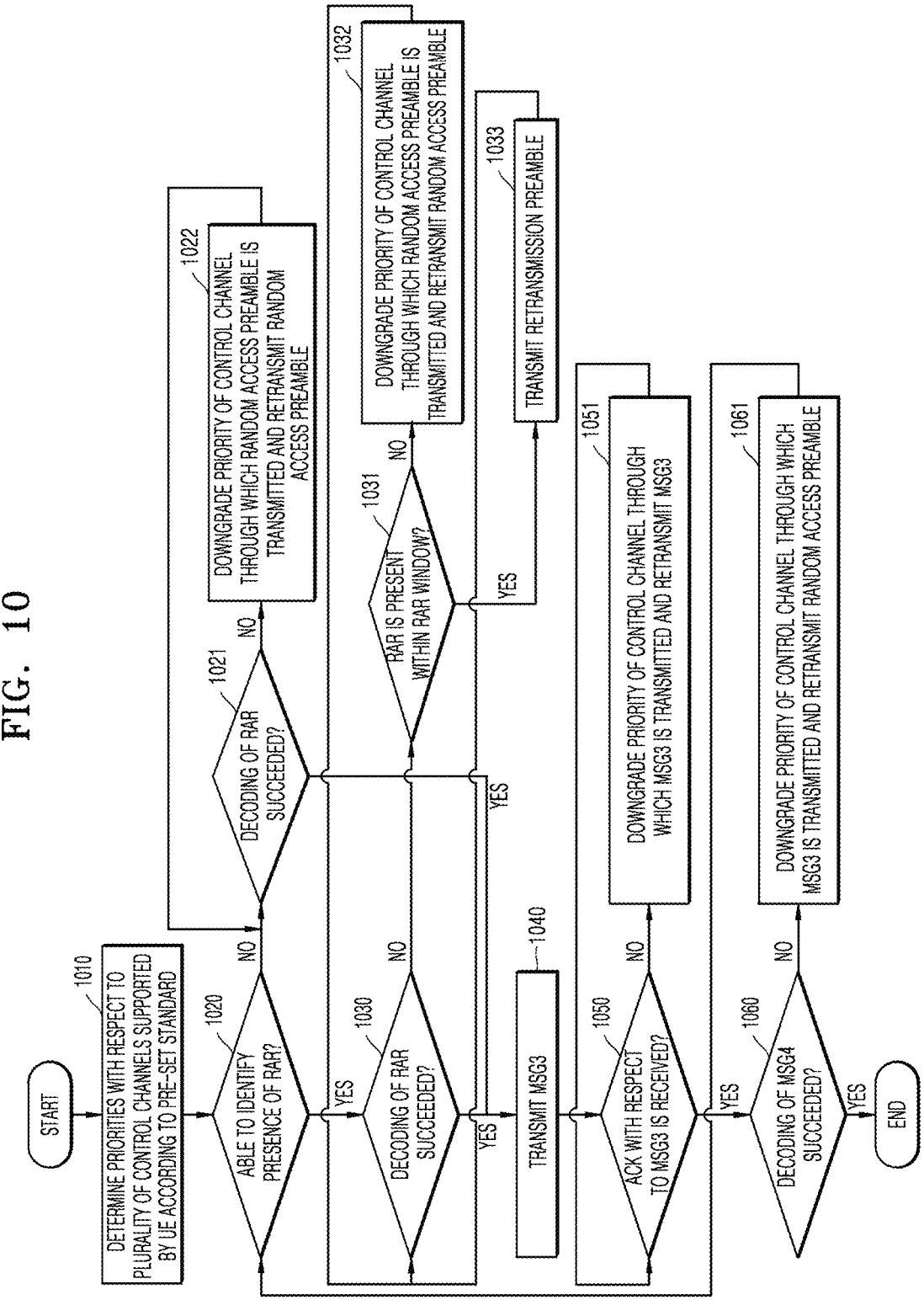
FIG. 10 illustrates a flowchart of a method, performed by a UE, of transmitting a preamble, based on priorities considered when determining a control channel through which a random access preamble is to be transmitted, according to some embodiments of the disclosure.

FIG. 10 illustrates a flowchart of a method, performed by a UE, of transmitting a preamble, based on priorities considered when determining a control channel through which a random access preamble is to be transmitted, according to some embodiments of the disclosure.

In operation 1010, the UE may determine priorities of a plurality of control channels supported by the UE, according to a pre-set standard.

For example, the priorities considered when determining the control channel through which the random access preamble is to be transmitted may be determined by using information received from a BS. The BS may determine the priorities with respect to the control channels supported by the BS and transmit the priorities to the UE. Alternatively, the BS may transmit channel utilization or channel preference of the BS to the UE. The BS may transmit, to the UE, such information through a broadcasting message such as a SIB or through radio resource control (RRC) signaling.

Also, for example, the priorities considered when determining the random access preamble may be determined based on channel utilization measured by the UE. Criteria of determining the priorities may vary and are not limited to the above examples.

Operations after the UE fails to decode RAR may vary based on whether the UE is able to identify presence of RAR in operation 1020.

There may be three situations in which the decoding of the RAR fails within an RAR window after the UE transmits the random access preamble. First, the BS may fail to decode the random access preamble and not transmit the RAR because power of the random access preamble weakens while passing through a channel or the random access preamble collides with another signal. For example, the BS may not receive the random access preamble because of a collision occurred due to transmission of a hidden node in the control channel through which the UE transmits the random access preamble. Second, despite the BS succeeding in decoding the random access preamble, the BS may be unable to complete LBT due to congested channels and may not transmit the RAR. Third, despite the BS transmitting the RAR, the UE may fail to decode the RAR because power of the RAR is weakened while passing through a channel or the RAR collides with another signal. For example, the UE may not receive the RAR because of a collision occurred due to transmission of a hidden node in a control channel through which the BS transmits the RAR.

In the first and second situations, the BS does not transmit the RAR and in the third situation, the BS transmits the RAR but the UE fails to decode the RAR. Accordingly, when the UE is able to identify whether the BS transmitted the RAR, i.e., identify the presence of the RAR, a situation in which the decoding of the RAR failed may be determined to be one of the first, second, or third situation. For example, the UE may determine whether the BS transmitted RAR by detecting a signal at a fixed location of a cell-specific reference signal (CRS).

In the first and second situations, the UE may downgrade the priority of the control channel through which the random access preamble is transmitted and retransmit the random access preamble by selecting a control channel based on the adjusted priorities. When the BS receives the retransmitted random access preamble, succeeds in decoding, and then transmits the RAR through a control channel where LBT succeeded, the UE may receive the RAR and succeeds in decoding.

In the third situation, the UE may transmit, to the BS, a retransmission preamble including information indicating to downgrade the priority of the control channel through which the BS transmitted the RAR. A generating condition of the retransmission preamble may be broadcast by the BS via a SIB or PBCH and received by the UE. For example, the BS may assign at least a part of a root index of a ZC sequence or at least a part of a preamble signature of the ZC sequence to the retransmission preamble. Upon receiving the retransmission preamble, the BS may downgrade the priority of the control channel through which the RAR is transmitted and retransmit the RAR by selecting a control channel based on the adjusted priorities. The UE may receive the retransmitted RAR and succeed in decoding.

According to some embodiments of the disclosure, the BS may transmit the RAR or msg4 according to the priorities considered when determining control channels through which the RAR or msg4 are to be transmitted, and the BS may determine priorities of the plurality of control channels supported by the BS. Because operations of the BS transmitting and receiving a signal by using the priorities correspond to those of the UE, details thereof will not be provided again.

When the UE is unable to identify the presence of the RAR, the UE may determine whether decoding of the RAR succeeded in operation 1021. When the UE fails to decode the RAR, the UE may downgrade the priority of the control channel through which the random access preamble is transmitted and retransmit the random access preamble by selecting a control channel based on the adjusted priorities, in operation 1022.

When the UE is able to identify the presence of the RAR, the UE may determine whether decoding of the RAR succeeded in operation 1030.

When the UE fails to decode the RAR, the UE may determine whether the RAR is present within an RAR window in operation 1031.

When the RAR is present within the RAR window, the UE may determine that the BS transmitted the RAR and transmit, to the BS, a retransmission preamble including information indicating to downgrade the priority of the control channel through which the BS transmitted the RAR, in operation 1032.

When the RAR is not present within the RAR window, the UE may determine that the BS did not transmit the RAR, and as in operation 1022, downgrade the control channel through which the random access preamble is transmitted and retransmit the random access preamble by selecting a control channel based on the adjusted priorities, in operation 1033.

For example, the priorities of the control channels of the BS supported by the UE at a point of time when the UE transmits the random access preamble may be 10 with respect to a first control channel, 8 with respect to a second control channel, 9 with respect to a third control channel, and 8 with respect to a fourth control channel. The UE may transmit the random access preamble through the first control channel having the highest priority. When the UE fails to decode the RAR within the RAR window, the UE may downgrade the priority of the first channel through which the random access preamble is transmitted by 2 (thus, the priority becomes 8), and retransmit the random access preamble through the third control channel having the highest priority based on the adjusted priorities.

When the UE succeeds in decoding of the RAR, the UE may transmit msg3 in operation 1040.

In operation 1050, the UE may determine whether acknowledgement (ACK) with respect to the msg3 is received. When the UE did not receive the ACK with respect to the msg3, for example, when negative ACK (NACK) is received, the UE may downgrade the priority of the control channel through which the msg3 is transmitted and retransmit the msg3 by selecting a control channel based on the adjusted priorities, in operation 1051.

When the ACK with respect to the msg3 is received, the UE may determine whether decoding of msg4 succeeded, in operation 1060. When the UE fails to decode the msg4, the UE may downgrade the priority of the control channel through which the msg3 is transmitted and retransmit the random access preamble by selecting a control channel based on the adjusted priorities, in operation 1061. When the UE succeeds in decoding of the msg4, the competition-based 4-step random access is completed.

Figure 11:
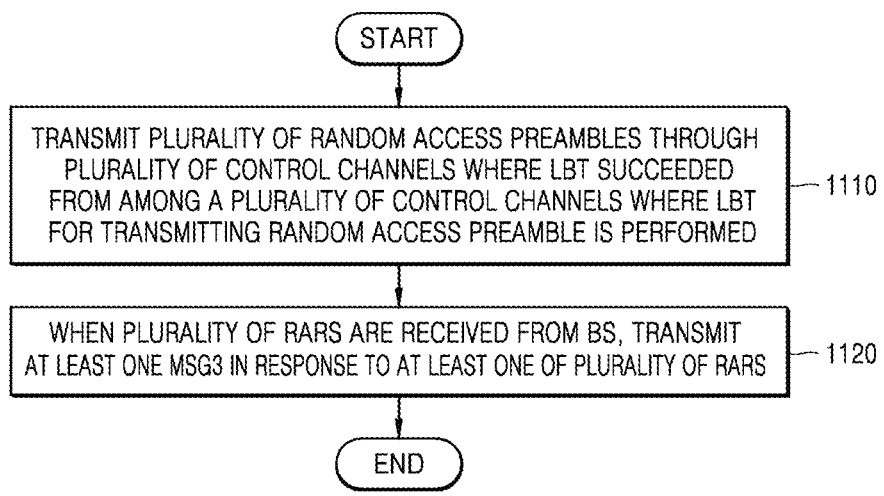
FIG. 11 illustrates a flowchart of a method, performed by a UE, of transmitting a plurality of random access preambles, according to some embodiments of the disclosure.

FIG. 11 illustrates a flowchart of a method, performed by a UE, of transmitting a plurality of random access preambles, according to some embodiments of the disclosure.

In operation 1110, the UE may transmit the plurality of random access preambles through a plurality of control channels where LBT succeeded from among a plurality of control channels where LBT for transmitting a random access preamble is performed.

For example, the UE may transmit the plurality of random access preambles respectively through all control channels where LBT succeeded. In this case, a random access success rate of the UE may be increased but a contention probability of the entire communication system may also be increased.

Also for example, the UE may transmit the plurality of random access preambles through at least some of the plurality of control channels where LBT succeeded. For example, the UE may transmit the plurality of random access preambles through some control channels having high priorities from among the plurality of control channels where LBT succeeded, based on the priorities described with reference to FIG. 10. When the plurality of random access preambles are transmitted through the some control channels, the random access success rate of the UE may be low but the contention probability of the entire communication system may be low compared to when the plurality of random access preambles are transmitted respectively through all the control channels where LBT succeeded. Criteria of selecting control channels through which the UE is to transmit the random access preambles may not be limited to the above example and may be variously determined.

The UE may generate and transmit the random access preambles by using a root index of a ZC sequence or a preamble signature of the ZC sequence independently for each of the plurality of control channels through which the plurality of random access preambles are transmitted. Also, the UE may generate and transmit the random access preambles by using the root index of the ZC sequence or the preamble signature of the ZC sequence for each of the plurality of control channels through which the plurality of random access preambles are transmitted, according to a rule defined by the BS.

For example, a random access preamble generating condition when the UE transmits the plurality of random access preambles through the plurality of control channels may be broadcast by the BS via a SIB or PBCH or may be received by the UE through RRC signaling. For example, the BS may assign at least a part of the root index of the ZC sequence or at least a part of the preamble signature of the ZC sequence with respect to a case where the UE transmits the plurality of random access preambles through the plurality of control channels and define an assigning rule.

When the UE generates and transmits the random access preambles by using the root index of the ZC sequence or the preamble signature of the ZC sequence independently for each of the plurality of control channels through which the plurality of random access preambles are transmitted, the BS may be unable to identify that the plurality of random access preambles received through the plurality of control channels are transmitted from one UE. Accordingly, the BS may transmit RAR in response to each of the plurality of received random access preambles.

When the UE generates and transmits the plurality of random access preambles according to a rule defined by the BS, the BS may be able to identify that the plurality of random access preambles received through the plurality of control channels are transmitted from one UE. Accordingly the BS may transmit one RAR in response to all of the plurality of received random access preambles.

When a plurality of RARs are received from the BS, the UE may transmit at least one msg3 corresponding to at least one of the plurality of RARs, in operation 1120.

For example, the UE may transmit one msg3 in response to the plurality of received RARs through one control channel where LBT for transmitting msg3 in response to RAR succeeded first. Also, for example, the UE may transmit msg3 in response to each of the plurality of received RARs.

The UE may transmit the at least one msg3 with the same contention resolution identifier (CRI). Accordingly, even when the plurality of msg3 are received, the BS is able to identify that the plurality of msg3 are received from one terminal and transmit one msg4.

Next, procedures of a 2-step random access according to some embodiments of the disclosure will be described.

According to some embodiments of the disclosure, the procedures of the 2-step random access may be performed according to operations that are the same as operations 410 and 420 of FIG. 4 and operations 310 to 330 of FIG. 3.

According to some embodiments of the disclosure, during the procedures of the 2-step random access, the UE may add additional information to the random access preamble to be transmitted. For example, the additional information included in the random access preamble may include at least one of information about whether the UE retransmitted the random access preamble, a control channel through which the UE transmitted the random access preamble before retransmission, a plurality of control channels of the BS supported by the UE, or a bandwidth size supported by the UE.

According to some embodiments of the disclosure, the BS may determine a control channel through which RAR is to be transmitted, based on the additional information included in the random access preamble received from the UE. For example, when the UE retransmitted the random access preamble, a priority of the control channel through which the random access preamble was transmitted before the retransmission may be downgraded and a control channel through which RAR is to be transmitted may be determined based on adjusted priorities.

Also, for example, the BS may identify a frequency region supported by the UE, based on the bandwidth size supported by the UE. With an example of a BWP of an NR communication method, the UE may perform communication by only using a partial frequency bandwidth supported by the UE from within a system bandwidth used by one cell. The bandwidth size supported by the UE may be equal to or larger than a bandwidth at which the UE transmitted the random access preamble. Accordingly, in order for the BS to identify the frequency region supported by the UE based on the bandwidth size supported by the UE, a rule is required about whether the frequency region supported by the UE includes an upper band of the band in which the UE transmitted the random access preamble, a lower band thereof, or both the upper and lower bands. For example, the rule may be defined by the BS and broadcast to the UE or the rule may be stored in the UE. The BS may identify the frequency region supported by the UE, based on the rule and the bandwidth size supported by the UE. The BS may determine the control channel through which RAR is to be transmitted, based on the identified frequency region supported by the UE.

When the UE receives RAR from the BS and succeeds in decoding, the procedures of the 2-step random access are completed.

Figure 12:
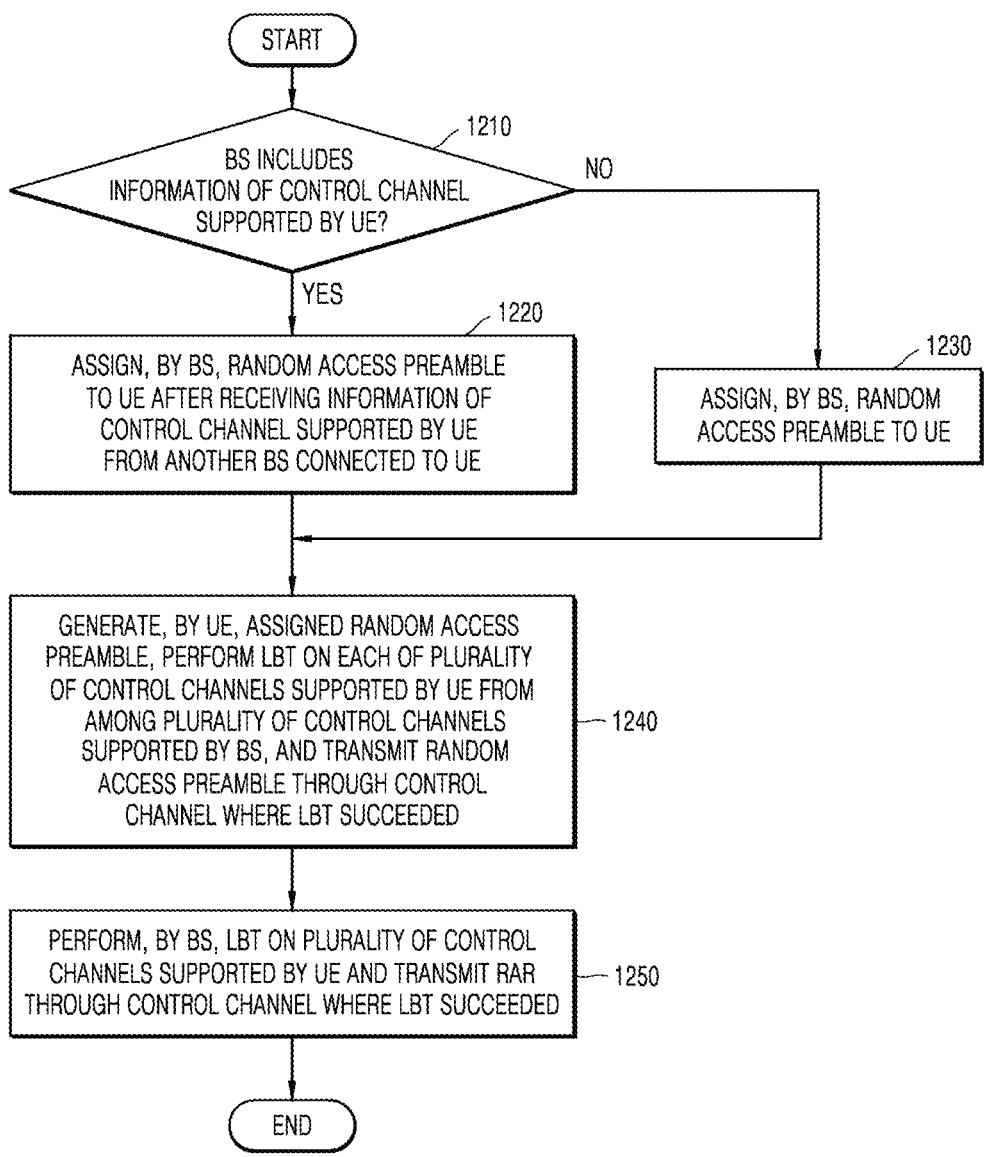
FIG. 12 illustrates a flowchart of a method, performed by a UE, of performing a contention-free random access on a base station by using multiple channels, according to some embodiments of the disclosure.

FIG. 12 illustrates a flowchart of a method, performed by a UE, of performing a contention-free random access on a BS by using multiple channels, according to some embodiments of the disclosure.

In operation 1210, an operation of the BS varies based on whether the BS includes information of a control channel supported by the UE.

When the UE is handed over from another BS, the BS does not include the information of the control channel supported by the UE. Accordingly, in operation 1230, the BS may assign a random access preamble to the UE after receiving the information of the control channel supported by the UE from the other BS connected to the UE. For example, the BS may receive the information through an X2 interface.

When the UE performs the contention-free random access on the BS currently connected for uplink synchronization, the BS includes the information of the control channel supported by the UE.

In operation 1220, the BS may assign the random access preamble to the UE.

In operations 1220 and 1230, the BS may perform LBT on each of a plurality of control channels of the BS supported by the UE, and transmit, to the UE, a signal of assigning the random access preamble through at least one control channel where LBT succeeded. For example, the BS may transmit, to the UE, a signal of assigning the random access preamble through a control channel where LBT succeeded first.

In operation 1240, the UE may generate the assigned random access preamble, perform LBT on each of the plurality of control channels of the BS supported by the UE, and transmit the random access preamble through a control channel where LBT succeeded. For example, the UE may transmit the random access preamble through at least one control channel where LBT succeeded first. Because the configuration of the UE performing LBT and transmitting the random access preamble corresponds to that described above, details thereof will not be provided again.

In operation 1250, the BS may perform LBT on the plurality of control channels supported by the UE and transmit RAR through a control channel where LBT succeeded. For example, the BS may transmit random RAR through the control channel where LBT succeeded first. When the UE receives RAR and succeeds in decoding, the contention-free random access is completed.

According to some embodiments of the disclosure, the BS may assign the plurality of random access preambles to the plurality of control channels of the UE, and the UE may perform LBT on the assigned control channels and transmit the random access preamble according to a result of LBT. Details of such an operation are the same as those of operation 1110 of FIG. 11 described above.

Figure 13:
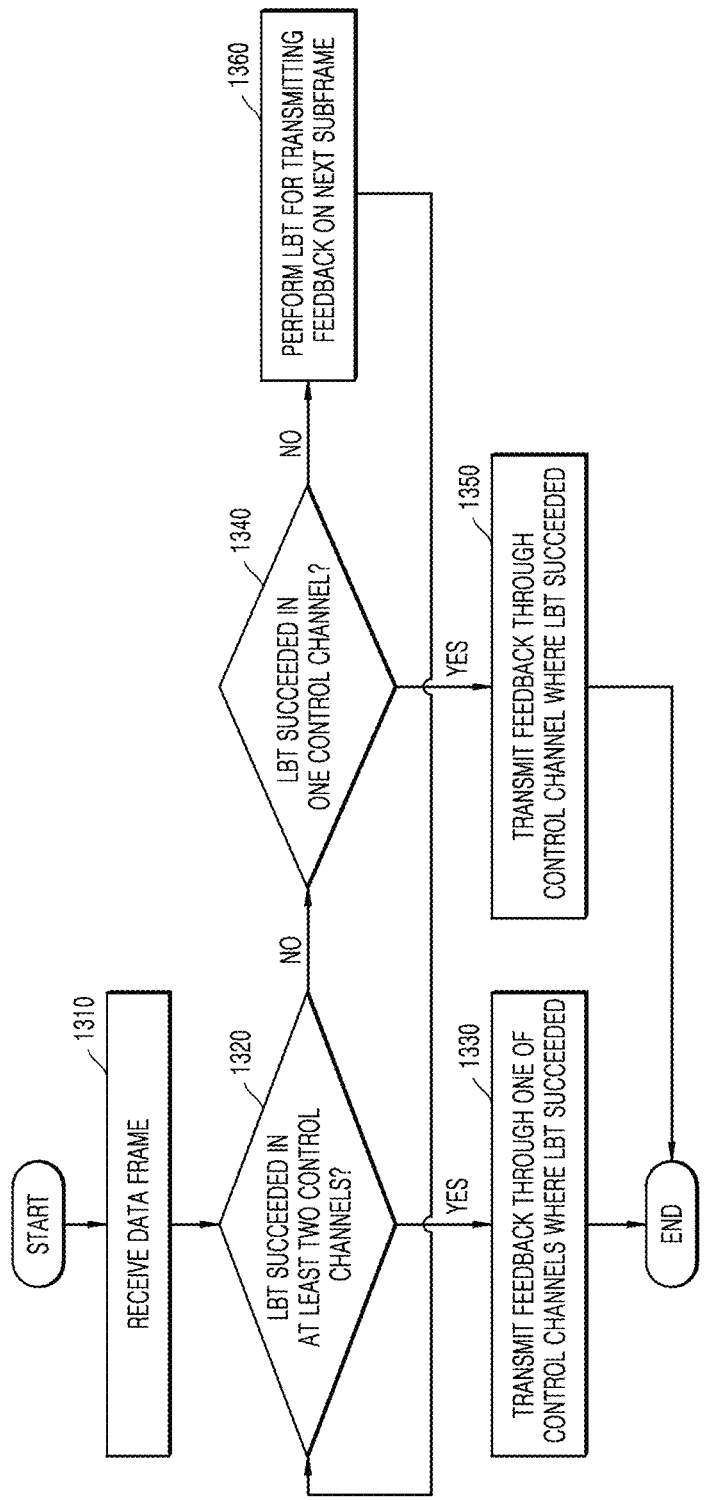
FIG. 13 illustrates a diagram for describing a method, performed by a UE, of transmitting feedback to a base station by using multiple channels, according to some embodiments of the disclosure.

FIGS. 13 and 14 illustrate diagrams for describing a method, performed by a UE, of transmitting feedback to a BS by using multiple channels, according to some embodiments of the disclosure.

The UE according to some embodiments of the disclosure may receive a downlink signal from the BS after the random access procedures described with reference to FIGS. 1 through 12 are completed. The UE may transmit feedback on the downlink signal. The feedback on the downlink signal may be, for example, HARQ feedback and CSI feedback.

According to some embodiments of the disclosure, the UE may transmit the feedback through a control channel assigned to transmit the feedback or a control channel that is not assigned, based on a result of LBT. In other words, regardless of assigning of a control channel for transmitting the feedback, the UE may perform LBT on each of a plurality of control channels of the BS supported by the UE and transmit the feedback through at least one control channel where LBT succeeded.

Referring to FIG. 13, in operation 1310, the UE may receive a data frame. The data frame may include at least one of a control signal or a data signal.

In operation 1320, the UE may determine whether LBT succeeded in at least two control channels.

In operation 1330, when LBT succeeded in at least two control channels, the UE may transmit the feedback through one of the control channels where LBT succeeded. For example, the UE may transmit the feedback through a control channel where LBT succeeded first.

In operation 1340, when LBT did not succeed in at least two control channels, the UE may determine whether LBT succeeded in one control channel.

In operation 1350, when LBT succeeded in one control channel, the UE may transmit the feedback through the control channel where LBT succeeded.

When there is no control channel where LBT succeeded, the UE may perform LBT for transmitting the feedback on a next subframe, in operation 1360.

Referring to reference numeral 1401 of FIG. 14, operations of the UE transmitting the feedback only through a first control channel 1411 assigned to transmit the feedback according to the related art are illustrated. In FIG. 14, the first control channel 1411, a second control channel 1412, a third control channel 1413 and a fourth control channel 1414 may exist. In this case, when the first control channel 1411 is congested due to another signal, LBT continuously fails and a delay time of transmission of the feedback is increased.

Referring to reference numeral 1402 of FIG. 14, operations of the UE transmitting the feedback according to some embodiments of the disclosure are illustrated. The UE performs (i.e. attempts) LBT on all of the first control channel 1421, the second control channel 1422, the third control channel 1423, and the fourth control channel 1424 of the BS supported by the UE, and then transmits the feedback through the third control channel 1423 where LBT succeeded first, thereby preventing feedback transmission failure or an increase in delay time caused by other communications in an unlicensed band.

Figure 15:
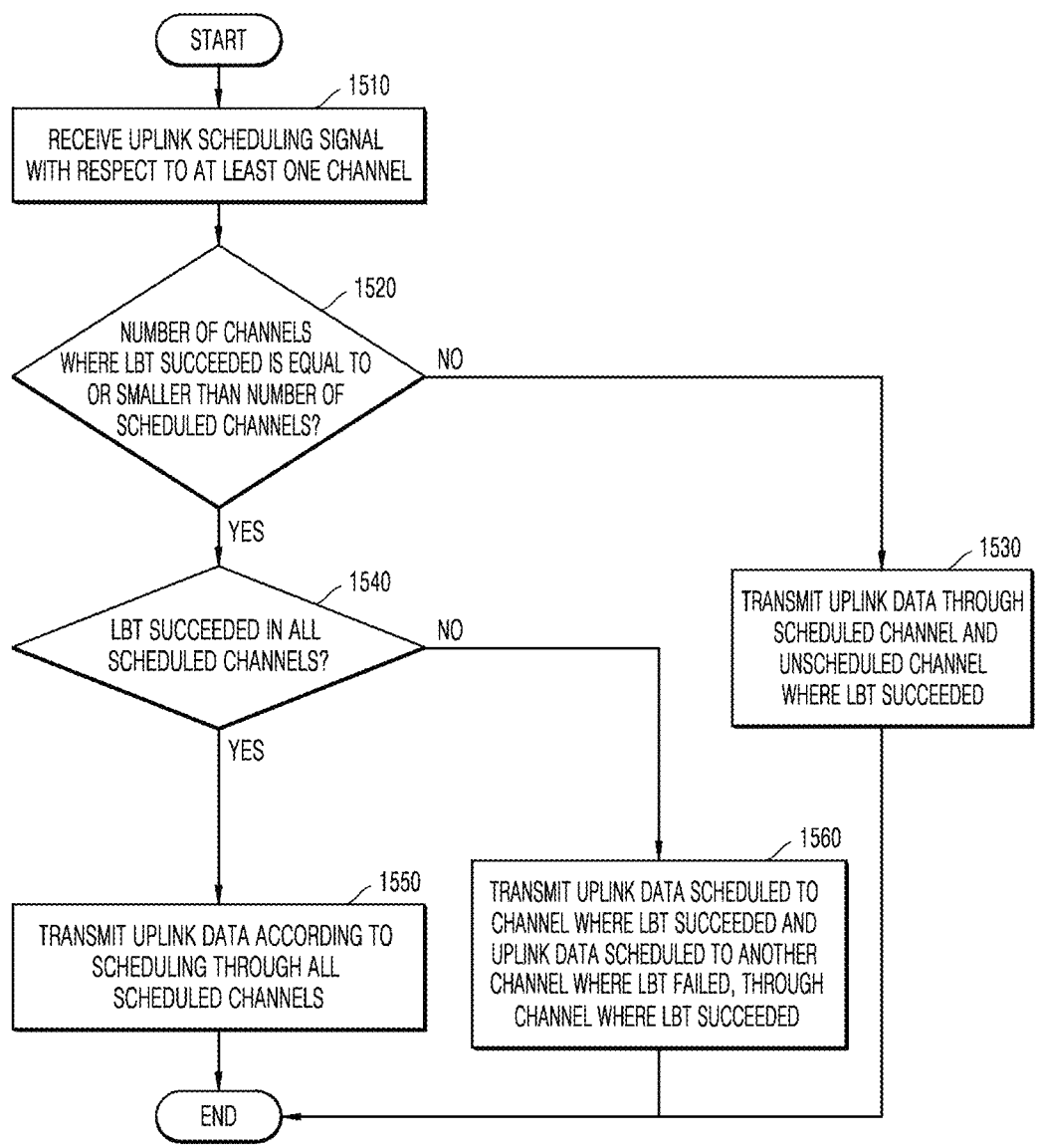
FIG. 15 illustrates a diagram for describing a method, performed by a UE, of transmitting uplink data to a base station by using multiple channels, according to some embodiments of the disclosure.
Figure 16:
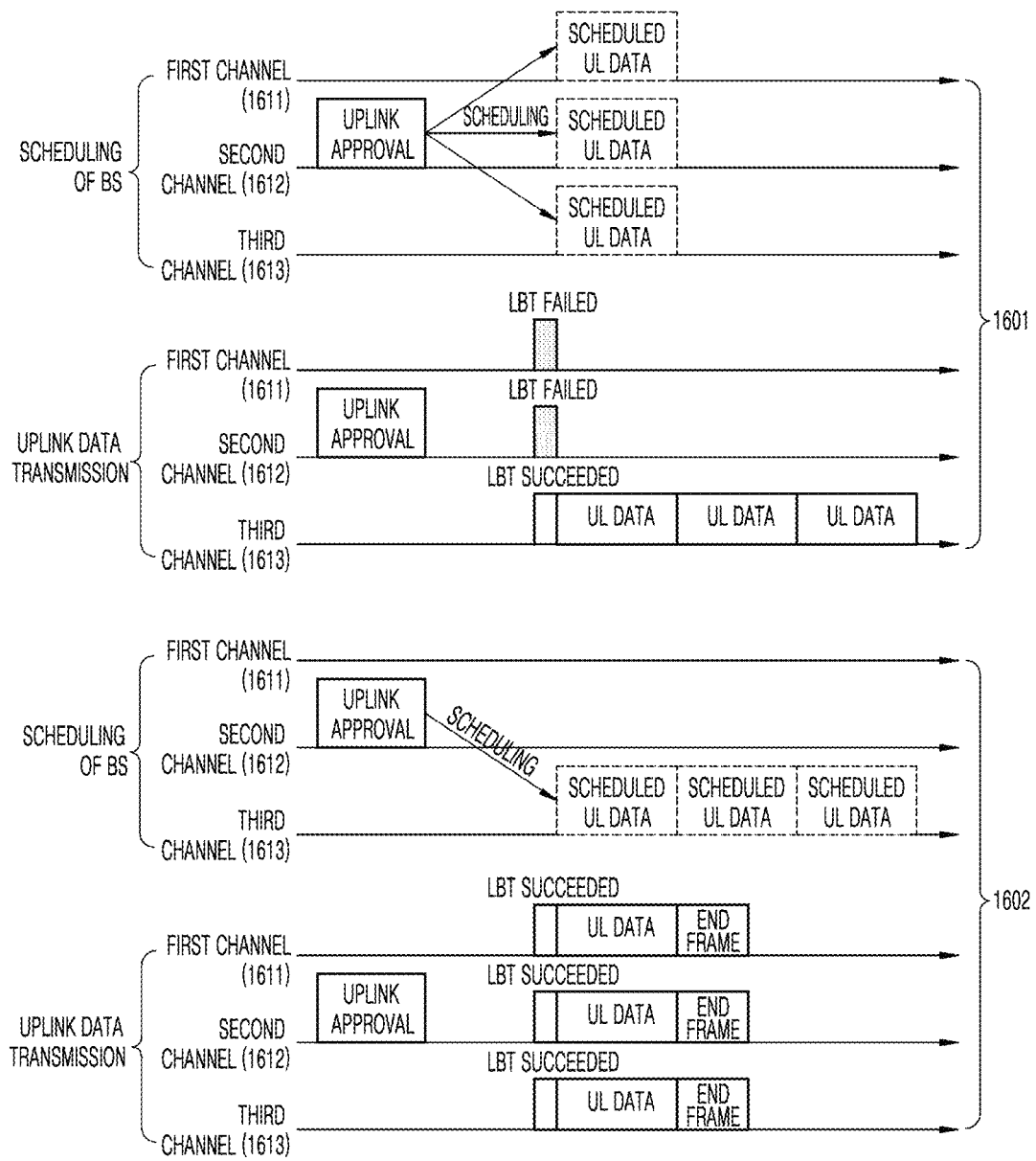
FIG. 16 illustrates a diagram for describing a method, performed by a UE, of transmitting uplink data to a base station by using multiple channels, according to some embodiments of the disclosure.
Figure 17:
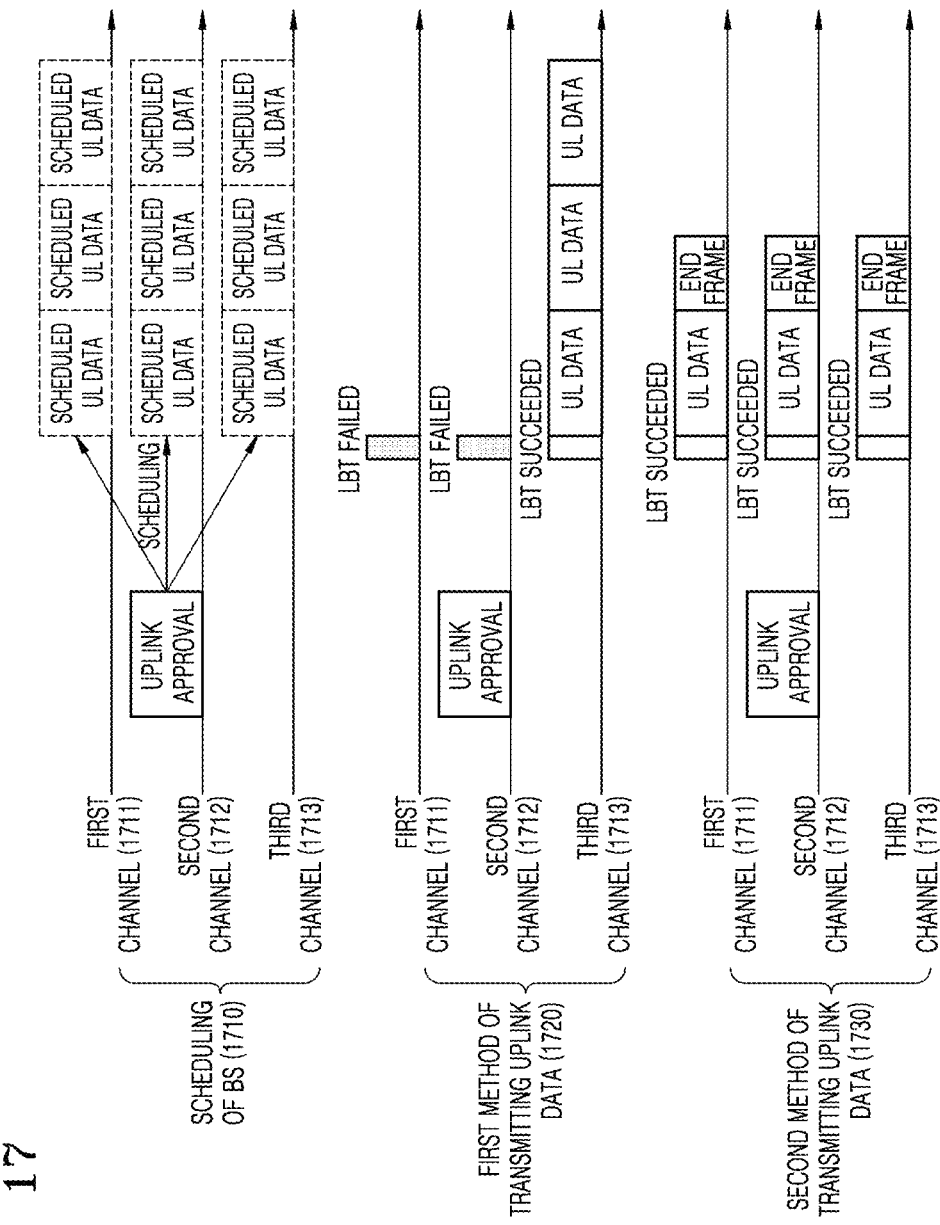
FIG. 17 illustrates a diagram for describing a method, performed by a UE, of transmitting uplink data to a base station by using multiple channels, according to some embodiments of the disclosure.

FIGS. 15 through 17 illustrate diagrams for describing a method, performed by a UE, of transmitting uplink data to a BS by using multiple channels, according to some embodiments of the disclosure.

In some embodiments of the disclosure described with reference to FIGS. 15 to 17, a channel includes both a control channel of the BS and a data channel transmitting and receiving a data signal.

The UE according to some embodiments of the disclosure may transmit the uplink data to the BS after the random access procedures described with reference to FIGS. 1 to 12 are completed. The UE may transmit the uplink data based on scheduling information regarding transmission of the uplink data, the scheduling information received from the BS.

According to some embodiments of the disclosure, the UE may perform LBT for transmitting the uplink data on each of the plurality of channels supported by the UE, determine at least one channel through which the uplink data is to be transmitted and a subframe of the uplink data to be transmitted through the at least one channel, based on the scheduling information regarding transmission of the uplink data and a result of the LBT, and transmit a subframe of the determined uplink data through the determined at least one channel.

Referring to FIG. 15, in operation 1510, the UE may receive an uplink scheduling signal with respect to at least one channel.

The UE may perform LBT for transmitting uplink data on each of a plurality of channels supported by the UE. For example, the UE may perform LBT for transmitting the uplink data on all of channels scheduled for uplink transmission and unscheduled channels. Also, for example, the UE may perform LBT only on the channels scheduled for uplink transmission.

In operation 1520, the UE may determine whether the number of channels where LBT succeeded is equal to or smaller than the number of scheduled channels. Also, for example, the UE may determine which channel among the channels where LBT succeeded is a scheduled channel. Also, the UE may determine how many of the channels where LBT succeeded are the scheduled channels.

When the BS scheduled the plurality of channels for uplink data transmission of the UE, LBT performed by the UE may fail in some of the channels.

When the number of channels where LBT succeeded is larger than the number of scheduled channels, the UE may transmit the uplink data through the scheduled channel and the unscheduled channel, where LBT succeeded, in operation 1530.

In order to reduce a delay time of uplink data transmission, the UE may transmit the uplink data even through the unscheduled channel when LBT succeeded. In this case, the UE may transmit an end frame to the BS after the uplink data transmission to notify that the transmission ended faster than scheduled.

Referring to reference numeral 1602 of FIG. 16, an example of a method, performed by the UE, of transmitting the uplink data, when the number of channels where LBT succeeded is larger than the number of scheduled channels, is illustrated. Referring to the reference numeral 1602, the BS performs scheduling such that a third channel 1613 transmits the uplink data. The UE performed LBT for transmitting the uplink data transmission not only on the third channel 1613 that is scheduled, but also on first and second channels 1611 and 1612 that are not scheduled, and LBT succeeded in the first through third channels 1611 through 1613. The UE may transmit the uplink data scheduled to the third channel 1613 by distributing the uplink data to the first through third channels 1611 through 1613. Also, the UE may transmit an end frame to the BS through each channel through which the uplink data is transmitted and notify that the transmission ended faster than scheduled.

When the number of channels where LBT succeeded is equal to or smaller than the number of scheduled channels, the UE may determine whether LBT succeeded in all scheduled channels, in operation 1540 of FIG. 15.

When LBT succeeded in all scheduled channels, the UE may transmit the uplink data according to scheduling through all the scheduled channels, in operation 1550.

When the number of channels where LBT succeeded is smaller than the number of scheduled channels, the UE may transmit the uplink data scheduled to the channel where LBT succeeded and the uplink data scheduled to another channel where LBT failed, through the channel where LBT succeeded, in operation 1560.

In order not to waste data scheduled to the channel where LBT failed, the UE may continuously transmit not only the data scheduled to the channel where LBT succeeded, but also the data scheduled to the channel where LBT failed, through the channel where LBT succeeded. Also, the UE may use PUSCH or PUCCH of previously scheduled transmission to transmit information about a channel and method of transmitting data to the BS.

Referring to reference numeral 1601 of FIG. 16, an example of a method, performed by the UE, of transmitting the uplink data, when the number of channels where LBT succeeded is smaller than the number of scheduled channels, is illustrated. Referring to the reference numeral 1601, the BS performs scheduling such that the uplink data is transmitted through first through third channels 1611 through 1613. The UE failed LBT in the first and second channels 1611 and 1612 among the scheduled channels. The UE may transmit not only data scheduled to the third channel 1613, but also data scheduled to the first and second channels 1611 and 1612 where LBT failed continuously, through the third channel 1613 where LBT succeeded.

According to some embodiments of the disclosure, when the BS preliminarily assigned more resources than those to be actually transmitted so as to speed up the uplink data transmission of the UE, the UE may determine a channel through which the uplink data is to be transmitted and resources at each channel, based on a result of LBT, and transmit the uplink data according to the determination. For example, when there are three subframes of data to be actually transmitted, the BS may schedule all three subframes respectively to three channels.

Referring to FIG. 17, an example in which a UE determines a channel through which uplink data is to be transmitted and resources at each channel according to a result of LBT and transmits the uplink data is illustrated.

Referring to reference numeral 1710, there are three subframes of data to be actually transmitted and the BS scheduled all three subframes respectively to first through third channels 1711 through 1713.

Referring to a first method 1720 of transmitting uplink data of FIG. 17, when LBT succeeded only in the third channel 1713 as a result of the UE performing LBT on all scheduled channels, all of the three subframes may be transmitted only through the third channel 1713.

Referring to a second method 1730 of transmitting uplink data of FIG. 17, when UE succeeds in LBT in all of scheduled channels, the UE may transmit one subframe through each of the first through third channels 1711 through 1713. The UE may transmit an end frame to the BS through each channel through which the uplink data is transmitted and notify that the transmission ended faster than scheduled. Meanwhile, FIG. 17 illustrates only an example and a method, performed by a UE, of determining a channel through which uplink data is to be transmitted and resources at each channel according to a result of LBT, and transmitting the uplink data is not limited to that shown in FIG. 17. For example, when LBT succeeded in at least two channels as a result of performing LBT on all scheduled channels, the UE may transmit data by distributing subframes of the uplink data to the channels where LBT succeeded.

Figure 18:
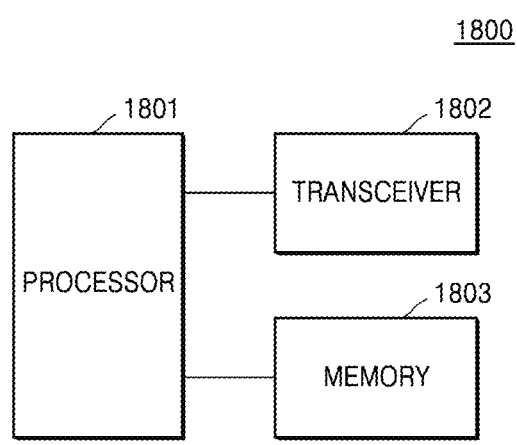
FIG. 18 illustrates a diagram of a structure of a UE, according to some embodiments of the disclosure.

FIG. 18 illustrates a diagram of a structure of a UE 1800, according to some embodiments of the disclosure.

Referring to FIG. 18, the UE 1800 may include a processor 1801, a transceiver 1802, and a memory 1803.

The processor 1801 according to some embodiments of the disclosure may be defined as a circuit, an application-specific integrated circuit, or at least one processor. The processor 1801 according to some embodiments of the disclosure may control overall operations of the UE 1800 according to some embodiments of the disclosure.

According to some embodiments of the disclosure, the processor 1801 may perform LBT for transmitting a random access preamble on each of a plurality of control channels supported by the UE 1800 from among a plurality of control channels supported by a BS, transmit a random access preamble through a control channel where LBT succeeded from among the plurality of control channels where LBT for transmitting a random access preamble is performed, and receive RAR through a control channel determined according to a result of LBT performed by the BS from among the plurality of control channels supported by the UE 1800. A control channel may be a channel through which a control signal and a data signal are transmitted and received.

According to some embodiments of the disclosure, the random access preamble controlled by the processor 1801 to be transmitted may be generated based on which control channel the UE 1800 supports from among the plurality of control channels supported by the BS, and the processor 1801 may determine whether scheduling information regarding msg3 is included in the RAR, perform LBT for transmitting msg3 on the plurality of control channels where LBT for transmitting a random access preamble is performed or at least one scheduled control channel, based on a result of the determination, transmit the msg3 through at least one control channel where LBT succeeded from among at least one control channel where LBT for transmitting msg3 is performed, and receive msg4 through a control channel determined as a result of LBT performed by the BS from among the plurality of control channels supported by the UE 1800.

According to some embodiments of the disclosure, the processor 1801 may transmit a plurality of random access preambles through a plurality of control channels where LBT succeeded from among the plurality of control channels where LBT for transmitting a random access preamble is performed, and when a plurality of RARs are received from the BS, transmit at least one msg3 corresponding to at least one RAR from among the plurality of RARs. The at least one msg3 may include the same CRI.

According to some embodiments of the disclosure, the RAR controlled by the processor 1801 to be received may include ID information of the control channel through which the UE 1800 transmitted the random access preamble, and the processor 1801 may determine whether the RAR is transmitted to the UE 1800, based on the ID information of the control channel or RA-RNTI generated according to the ID information of the control channel.

According to some embodiments of the disclosure, the processor 1801 may determine priorities of the plurality of control channels supported by the UE 1800, according to a pre-set standard, wherein the priorities are considered while determining a control channel through which a random access preamble is to be transmitted, and when there are two or more control channels where LBT succeeded from among the plurality of control channels where LBT for transmitting a random access preamble is performed, determine a control channel through which the random access preamble is to be transmitted, based on the determined priorities, and transmit the random access preamble through the determined control channel.

According to some embodiments of the disclosure, when decoding of RAR fails, the processor 1801 downgrades the priority of the control channel through which the UE 1800 transmitted the random access preamble, determine a control channel through which the random access preamble is to be retransmitted, based on the adjusted priorities, and retransmit the random access preamble through the determined control channel.

According to some embodiments of the disclosure, when decoding of RAR fails, the processor 1801 may transmit a retransmission preamble including information indicating to downgrade the priority of the control channel through which the BS transmitted RAR is transmitted.

According to some embodiments of the disclosure, when decoding of RAR fails, the processor 1801 may retransmit the random access preamble by increasing transmission power through the control channel through which the UE 1800 transmitted the random access preamble.

According to some embodiments of the disclosure, the random access preamble controlled by the processor 1801 to be transmitted may be assigned by the BS.

According to some embodiments of the disclosure, the random access preamble controlled by the processor 1801 to be transmitted may be generated based on which control channel the UE 1800 supports from among the plurality of control channels supported by the BS, and may include at least one of information about whether the UE 1800 retransmitted the random access preamble, a control channel through which the UE 1800 transmitted random access preamble before retransmission, the plurality of control channels supported by the UE 1800, or a bandwidth size supported by the UE 1800. The control channel through which RAR is received may be determined based on at least one of the information included in the random access preamble.

According to some embodiments of the disclosure, the processor 1801 may perform LBT for transmitting feedback on downlink data transmission on each of the plurality of control channels supported by the UE 1800 from among the plurality of control channels supported by the BS, and transmit the feedback on the downlink data transmission through a control channel where LBT succeeded from among the plurality of control channels where LBT for transmitting feedback is performed.

According to some embodiments of the disclosure, the processor 1801 may perform LBT for transmitting uplink data on each of the plurality of channels supported by the UE 1800, determine at least one channel through which the uplink data is to be transmitted and a subframe of the uplink data to be transmitted through at least one channel, based on a result of LBT for transmitting uplink data and scheduling information regarding transmitting of uplink data, and transmit the determined subframe of the uplink data through the determined at least one channel.

The transceiver 1802 according to some embodiments of the disclosure may transmit or receive a data signal through a channel as described above or may transmit or receive a control signal and a data signal through a control channel.

The memory 1803 according to some embodiments of the disclosure may store at least one of information transmitted and received through the transceiver 1802 or information generated through the processor 1801.

Figure 19:
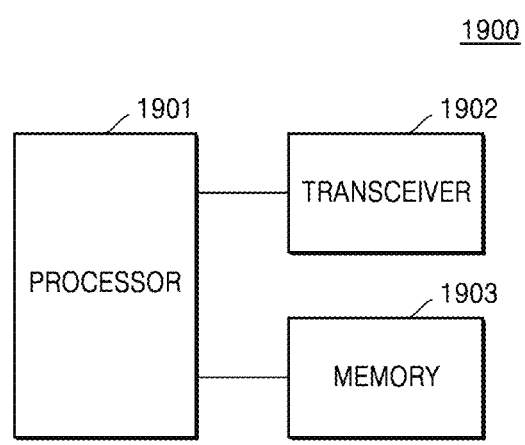
FIG. 19 illustrates a diagram of a structure of a base station, according to some embodiments of the disclosure.

FIG. 19 illustrates a diagram of a structure of a BS 1900, according to some embodiments of the disclosure.

Referring to FIG. 19, the BS 1900 includes a processor 1901, a transceiver 1902, and a memory 1903.

The processor 1901 according to some embodiments of the disclosure may be defined as a circuit, an application-specific integrated circuit, or at least one processor. The processor 1801 according to some embodiments of the disclosure may control overall operations of the BS 1900 according to some embodiments of the disclosure.

According to some embodiments of the disclosure, the processor 1901 may transmit information of a plurality of control channels supported by the BS 1900, receive a random access preamble through a control channel determined as a result of LBT performed by a UE from among the pluralities of control channels supported by the UE and the BS 1900, perform LBT for transmitting RAR on each of the plurality of control channels supported by the UE from among the plurality of control channels supported by the BS 1900, and transmit RAR through a control channel determined as a result of LBT performed by the BS 1900 from among the plurality of control channels supported by the UE. The control channel is a channel through which a control signal and a data signal are transmitted and received, and the random access preamble may be generated based on which control channel the UE supports from among the plurality of control channels supported by the BS 1900.

According to some embodiments of the disclosure, the random access preamble controlled by the processor 1901 to be received may be generated based on which control channel the UE supports from among the plurality of control channels supported by the BS 1900, and the processor 1901 may receive msg3 through a control channel determined as a result of LBT performed by the UE from among the pluralities of control channels supported by the UE and the BS 1900, and transmit msg4 through a control channel determined as a result of LBT performed by the BS 1900 from among the plurality of control channels supported by the UE.

According to some embodiments of the disclosure, the processor 1901 may receive a plurality of random access preambles from the UE, transmit a plurality of RARs through a plurality of control channels determined as a result of LBT performed by the BS 1900 from among the plurality of control channels supported by the UE, and receive at least one smg3 having the same CRI.

According to some embodiments of the disclosure, the RAR controlled by the processor 1901 to be transmitted may include ID information of the control channel through which the UE transmitted the random access preamble.

According to some embodiments of the disclosure, the processor 1901 may determine priorities of the plurality of control channels supported by the BS 1900 according to a pre-set standard, wherein the priorities are considered while determining a control channel through which RAR or msg4 is to be transmitted, and when there are two or more control channels where LBT succeeded from among the plurality of control channels where LBT for transmitting RAR or msg4 is performed, determine a control channel through which RAR or msg4 is to be transmitted, based on the determined priorities, and transmit RAR or msg4 through the determined control channel.

According to some embodiments of the disclosure, the processor 1901 may receive, from the UE, a retransmission preamble including information indicating to downgrade a priority of the control channel through which the BS 1900 transmitted RAR, and downgrade the priority of the control channel through which RAR is transmitted, based on the information included in the received retransmission preamble.

According to some embodiments of the disclosure, the random access preamble controlled by the processor 1901 to be received may include at least one of information about whether the UE retransmitted the random access preamble, a control channel through which the UE transmitted the random access preamble before retransmission, the plurality of control channels supported by the UE, or a bandwidth size supported by the UE, and the processor 1901 may determine the control channel through which RAR is to be transmitted, based on at least one of the information included in the random access preamble.

The transceiver 1902 according to some embodiments of the disclosure may transmit or receive a data signal through a channel as described above or may transmit or receive a control signal and a data signal through a control channel.

The memory 1903 according to some embodiments of the disclosure may store at least one of information transmitted and received through the transceiver 1902 or information generated through the processor 1901.

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs may include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

Meanwhile, in the detailed description of the disclosure, specific embodiments of the disclosure have been described. However, various modifications may be possible without departing from the scope of the disclosure. Therefore, the scope of the disclosure should not be limited to the described embodiments of the disclosure, but should be determined not only by the scope of the following claims, but also by the equivalents of the claims.

The block diagrams in the disclosure may be interpreted by one of ordinary skill in the art as conceptually representing a circuit for implementing the principles of the disclosure. Similarly, it would be obvious to one of ordinary skill in the art that any flowchart, flow diagram, state diagram, pseudocode, etc. may be substantially represented on a computer readable medium to indicate various processes executable by a computer or a processor regardless of whether the computer or the processor is explicitly illustrated. Accordingly, the embodiments of the disclosure may be written as a program executable on a computer, and may be implemented in a general-purpose digital computer operating the program using a computer readable recording medium. The computer readable recording medium may include a storage medium such as a magnetic storage medium (e.g., a ROM, a floppy disk, a hard disk, etc.) and an optical reading medium (e.g., a CD-ROM, a DVD, etc.).

The functions of the various elements shown in the drawings may be provided through the use of dedicated hardware as well as hardware capable of executing software in association with appropriate software. When provided by a processor, such functions may be provided by a single dedicated processor, a single shared processor, or a plurality of individual processors, some of which may be shared. In addition, the explicit use of the term "processor" or "control unit" should not be construed as exclusively referring to hardware capable of executing software, and may include, without limitation, digital signal processor (DSP) hardware, read-only memory (ROM) for storing software, random access memory (RAM), and non-volatile storage.

In the claims of the specification, an element represented as a means for performing a specific function encompasses any method of performing the specific function, and the element may include a combination of circuit elements performing the specific function, or any form of software including a firmware or microcode combined to a suitable circuit to perform software for performing the specific function.

Reference herein to 'one embodiment' of the principles of the disclosure and various modifications of this expression indicate that particular features, structures, features, and the like, are included in at least one embodiment of the principles of the disclosure. Thus, the expression 'according to one embodiment of the disclosure' and any other variation stated throughout this specification are not necessarily all referring to the same embodiment of the disclosure.

Throughout the disclosure, the expression "at least one of a, b or c" indicates only a, only b, only c, both a and b, both a and c, both b and c, all of a, b, and c, or variations thereof. Throughout the disclosure, the expression "at least one of a, b or c" indicates only a, only b, only c, both a and b, both a and c, both b and c, all of a, b, and c, or variations thereof. Even when more items are enumerated, it may be obviously extendedly interpreted by one of ordinary skill in the art.

Hereinabove, the embodiments of the disclosure have been mainly described.

Although the present disclosure has been described with various embodiments, various changes and modifications may be suggested to one skilled in the art. It is intended that the present disclosure encompass such changes and modifications as fall within the scope of the appended claims.

What is claimed is:

1. A communication method using a plurality of channels in a wireless communication system supporting an unlicensed band, the communication method comprising:
   performing listen-before-talk (LBT) for transmitting a random access preamble on each of a plurality of control channels supported by a user equipment (UE), from among a plurality of control channels supported by a base station;
   transmitting a random access preamble through a control channel where the LBT succeeded from among the plurality of control channels where the LBT for transmitting the random access preamble is performed; and
   receiving a random access response (RAR) through a control channel determined according to a result of LBT performed by the base station, from among the plurality of control channels supported by the UE,
   wherein the transmitting of the random access preamble comprises:
      determining priorities with respect to the plurality of control channels supported by the UE, based on a pre-set standard, wherein the priorities are considered when determining a control channel through which the random access preamble is to be transmitted;
      determining a control channel through which the random access preamble is to be transmitted, based on the determined priorities, when there are two or more control channels where the LBT succeeded from among the plurality of control channels where the LBT for transmitting the random access preamble is performed; and
      transmitting the random access preamble through the determined control channel.

2. The communication method of claim 1, wherein:
the random access preamble is generated based on a control channel supported by the UE from among the plurality of control channels supported by the base station; and
the communication method further comprises:
   determining whether scheduling information regarding a third message (msg3) is included in the received RAR;
   performing LBT for transmitting the msg3 on at least one scheduled control channel or the plurality of control channels where the LBT for transmitting the random access preamble is performed, based on a result of the determining;
   transmitting the msg3 through at least one control channel where the LBT for transmitting the msg3 succeeded from among at least one control channel where the LBT for transmitting the msg3 is performed; and
   receiving a fourth message (msg4) through a control channel determined according to a result of the LBT performed by the base station, from among the plurality of control channels supported by the UE.

3. The communication method of claim 2, wherein:
the transmitting of the random access preamble comprises:
   transmitting a plurality of random access preambles through a plurality of control channels where the LBT succeeded from among the plurality of control channels where the LBT for transmitting the random access preamble is performed, and
the transmitting of the msg3 comprises:
   in case that a plurality of RARs are received from the base station, transmitting at least one msg3 corresponding to at least one RAR from among the plurality of RARs,
wherein the at least one msg3 comprises a same contention resolution identifier (CRI).

4. The communication method of claim 2, wherein:
the RAR comprises identification information of a control channel through which the UE transmitted the random access preamble; and
the communication method further comprises:
   determining whether the RAR is transmitted to the UE, based on the identification information of the control channel or a random access-radio network temporary identifier (RA-RNTI) generated according to the identification information of the control channel.

5. The communication method of claim 1, further comprising:
retransmitting the random access preamble in case that decoding of the RAR fails; wherein the retransmitting of the random access preamble comprises:
   downgrading the priority of the control channel through which the random access preamble is transmitted;
   determining a control channel through which the random access preamble is to be retransmitted, based on the downgraded priority; and
   retransmitting the random access preamble through the determined control channel.

6. The communication method of claim 1, further comprising:
in case that decoding of the RAR fails, transmitting a retransmission preamble comprising information enabling the base station to downgrade the priority of the control channel through which the RAR is transmitted.

7. The communication method of claim 1, further comprising:
retransmitting the random access preamble in case that decoding of the RAR fails, wherein the retransmitting of the random access preamble comprises:
   in case that the UE retransmits the random access preamble through the control channel through which the random access preamble is transmitted, retransmitting the random access preamble after increasing transmission power.

8. The communication method of claim 1, wherein the random access preamble is assigned by the base station.

9. The communication method of claim 1, wherein:
the random access preamble is generated based on which control channel the UE supports from among the plurality of control channels supported by the base station, and comprises at least one piece of information from among information about whether the UE retransmitted the random access preamble, the control channel through which the random access preamble is transmitted before the UE retransmits the random access preamble, the plurality of control channels supported by the UE, and a bandwidth size supported by the UE; and
the control channel through which the RAR is received is determined based on at least one piece of information from among the information included in the random access preamble.

10. The communication method of claim 1, further comprising:
transmitting feedback on downlink data transmission, wherein the transmitting of the feedback comprises:
performing LBT for transmitting the feedback on each of the plurality of control channels supported by the UE from among the plurality of control channels supported by the base station; and
transmitting the feedback through a control channel where the LBT succeeded from among the plurality of control channels where the LBT for transmitting the feedback is performed.

11. The communication method of claim 1, further comprising:
transmitting uplink data, wherein the transmitting of the uplink data comprises:
performing LBT for transmitting the uplink data on each of the plurality of control channels supported by the UE;
determining at least one channel through which the uplink data is to be transmitted and a subframe of the uplink data to be transmitted through the at least one channel, based on a result of the LBT for transmitting the uplink data and scheduling information regarding transmission of the uplink data; and
transmitting the determined subframe of the uplink data through the determined at least one channel.

12. A user equipment (UE) using a plurality of channels in a wireless communication system supporting an unlicensed band, the UE comprising:
a transceiver;
a memory; and
at least one processor configured to:
perform listen-before-talk (LBT) for transmitting a random access preamble on each of a plurality of control channels supported by the UE from among a plurality of control channels supported by a base station;
determine priorities with respect to the plurality of control channels supported by the UE, based on a pre-set standard, wherein the priorities are considered when determining a control channel through which the random access preamble is to be transmitted;
determine a control channel through which the random access preamble is to be transmitted, based on the determined priorities, when there are two or more control channels where the LBT succeeded from among the plurality of control channels where the LBT for transmitting the random access preamble is performed;
transmit the random access preamble through the determined control channel; and
receive a random access response (RAR) through a control channel determined as a result of the LBT performed by the base station from among the plurality of control channels supported by the UE.

13. The UE of claim 12, wherein:
the random access preamble is generated based on a control channel supported by the UE from among the plurality of control channels supported by the base station; and
the processor is further configured to:
determine whether scheduling information regarding a third message (msg3) is included in the received RAR;
perform LBT for transmitting the msg3 on at least one scheduled control channel or the plurality of control channels where the LBT for transmitting the random access preamble is performed, based on a result of the determination;
transmit the msg3 through at least one control channel where the LBT for transmitting the msg3 succeeded from among at least one control channel where the LBT for transmitting the msg3 is performed; and
receive a fourth message (msg4) through a control channel determined according to a result of the LBT performed by the base station, from among the plurality of control channels supported by the UE.

14. The UE of claim 12, wherein the processor is further configured to:
in case that decoding of the RAR fails:
downgrade a priority of the control channel through which the random access preamble is transmitted;
determine a control channel through which the random access preamble is to be retransmitted, based on the downgraded priority; and
retransmit the random access preamble through the determined control channel.

15. The UE of claim 12, wherein the processor is further configured to:
perform LBT for transmitting feedback on each of the plurality of control channels supported by the UE from among the plurality of control channels supported by the base station; and
transmit the feedback through a control channel where the LBT succeeded from among the plurality of control channels where the LBT for transmitting the feedback is performed.

16. The UE of claim 12, wherein the processor is further configured to:
perform LBT for transmitting uplink data on each of the plurality of control channels supported by the UE;
determine at least one channel through which the uplink data is to be transmitted and a subframe of the uplink data to be transmitted through the at least one channel, based on a result of the LBT for transmitting the uplink data and scheduling information regarding transmission of the uplink data; and
transmit the determined subframe of the uplink data through the determined at least one channel.

17. A communication method using a plurality of channels in a wireless communication system supporting an unlicensed band, the communication method comprising:
transmitting information of a plurality of control channels supported by a base station to a user equipment (UE);
receiving, from the UE, a random access preamble through a control channel determined as a result of listen-before-talk (LBT) performed by the UE from among pluralities of control channels supported by the UE and the base station;

performing LBT for transmitting a random access response (RAR) on each of the plurality of control channels supported by the UE from among the plurality of control channels supported by the base station;

transmitting the RAR through a control channel determined as a result of the LBT performed by the base station from among the plurality of control channels supported by the UE;

receiving, from the UE, a retransmission preamble comprising information enabling the base station to downgrade a priority of the control channel through which the RAR is transmitted;

downgrading the priority of the control channel through which the RAR is transmitted;

determining a control channel through which the RAR is to be retransmitted, based on the downgraded priority; and retransmitting the RAR through the determined control channel, wherein the control channel is a channel through which a control signal and a data signal are transmitted and received, and the random access preamble is generated based on a control channel supported by the UE from among the plurality of control channels supported by the base station.

18. A base station using a plurality of channels in a wireless communication system supporting an unlicensed band, the base station comprising:

a transceiver;

a memory; and at least one processor configured to:

transmit information of a plurality of control channels supported by the base station to a user equipment (UE);

receive a random access preamble through a control channel determined as a result of listen-before-talk (LBT) performed by the UE from among pluralities of control channels supported by the UE and the base station;

perform LBT for transmitting a random access response (RAR) on each of the plurality of control channels supported by the UE from among the plurality of control channels supported by the base station;

transmit the RAR through a control channel determined as a result of the LBT performed by the base station from among the plurality of control channels supported by the UE;

receive, from the UE, a retransmission preamble comprising information enabling the base station to downgrade a priority of the control channel through which the RAR is transmitted;

downgrade the priority of the control channel through which the RAR is transmitted;

determine a control channel through which the RAR is to be retransmitted, based on the downgraded priority; and retransmit, to the UE, the RAR through the determined control channel, wherein the control channel is a channel through which a control signal and a data signal are transmitted and received, and the random access preamble is generated based on a control channel supported by the UE from among the plurality of control channels supported by the base station.

\* \* \* \* \*